INVENTOR:
GLENN T. RANDOL,
BY P. H. Lamphere
HIS ATTORNEY.

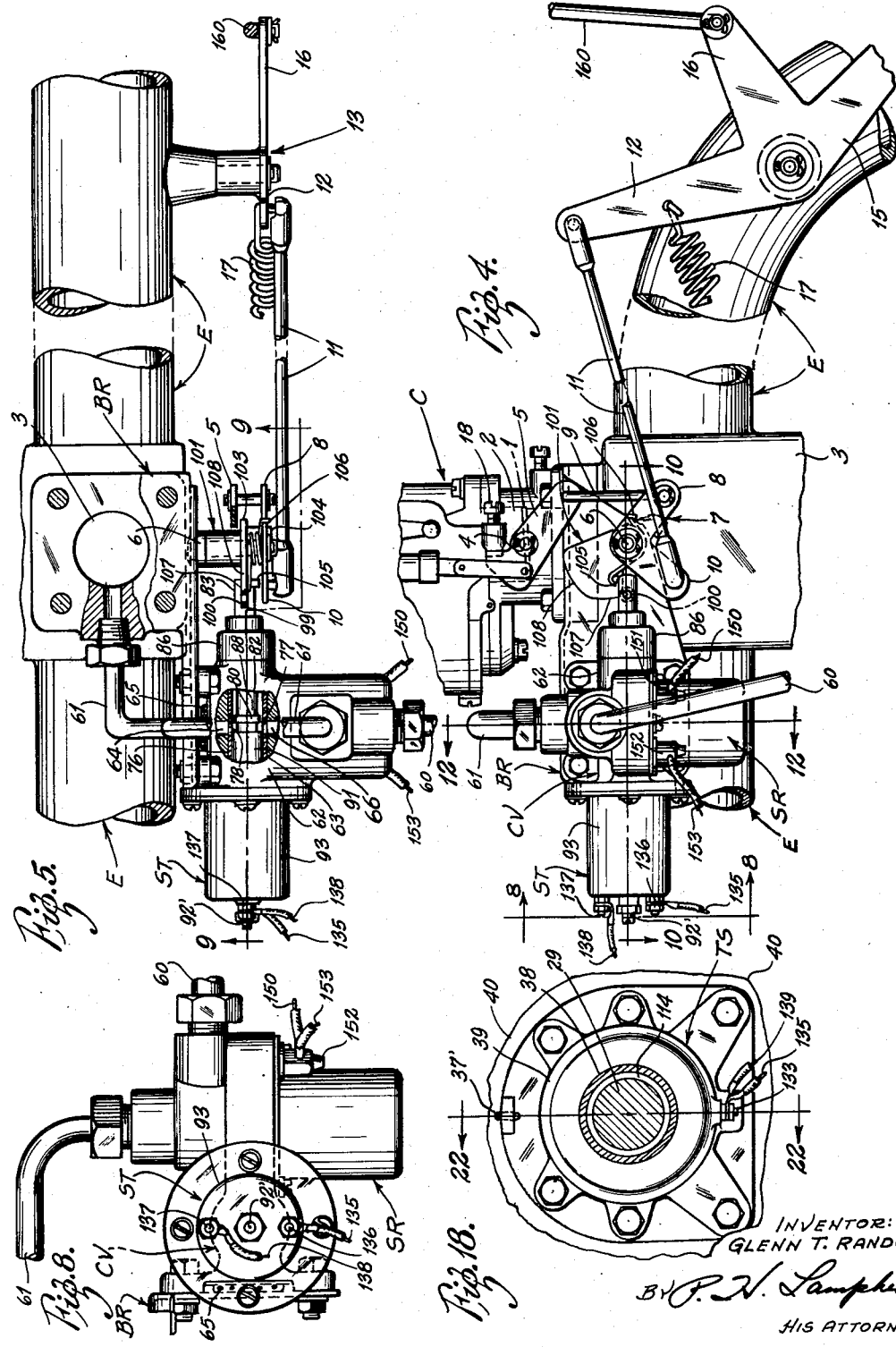

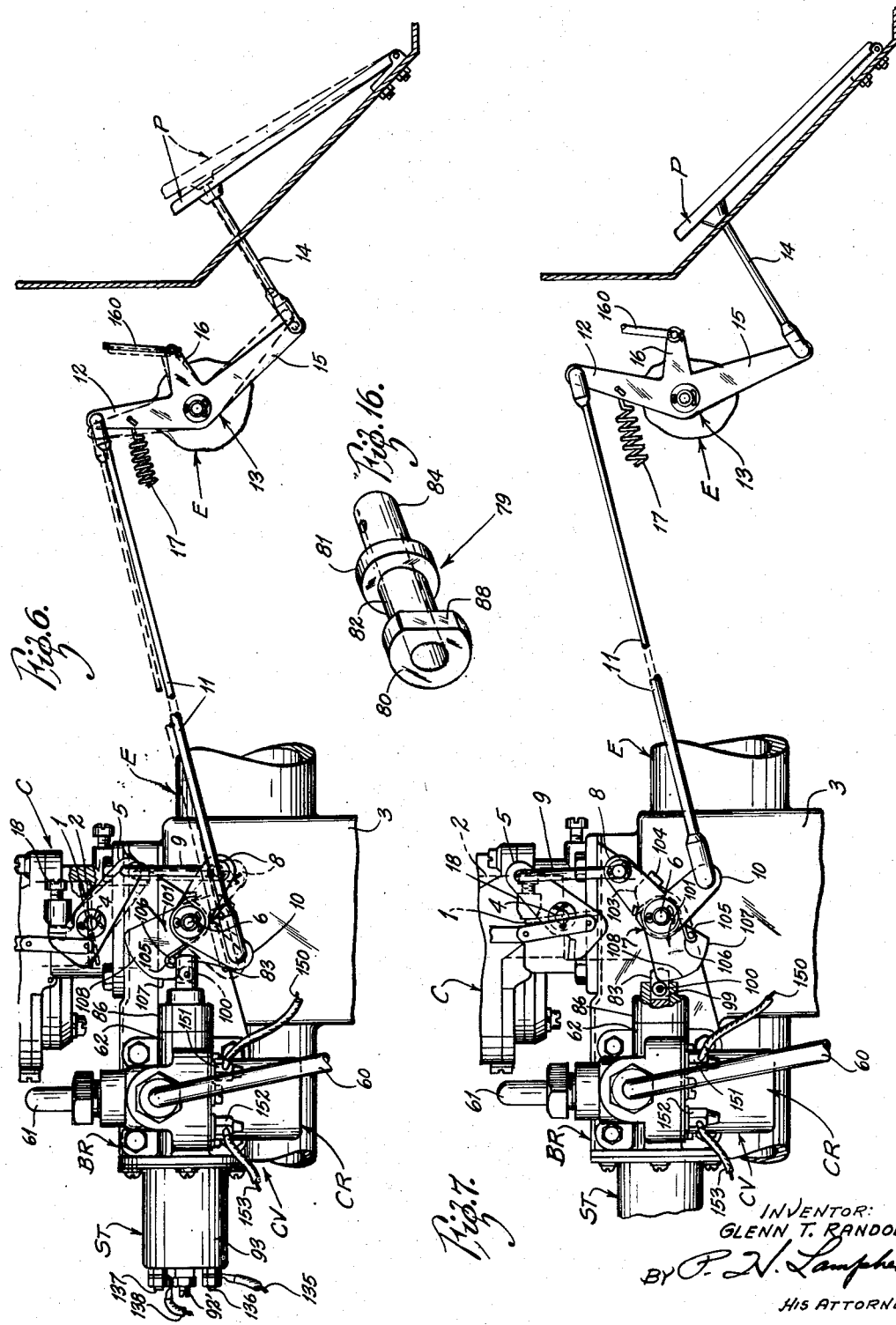

Jan. 6, 1953     G. T. RANDOL     2,624,432
AUTOMOTIVE FRICTION CLUTCH
Filed July 18, 1946     8 Sheets-Sheet 5
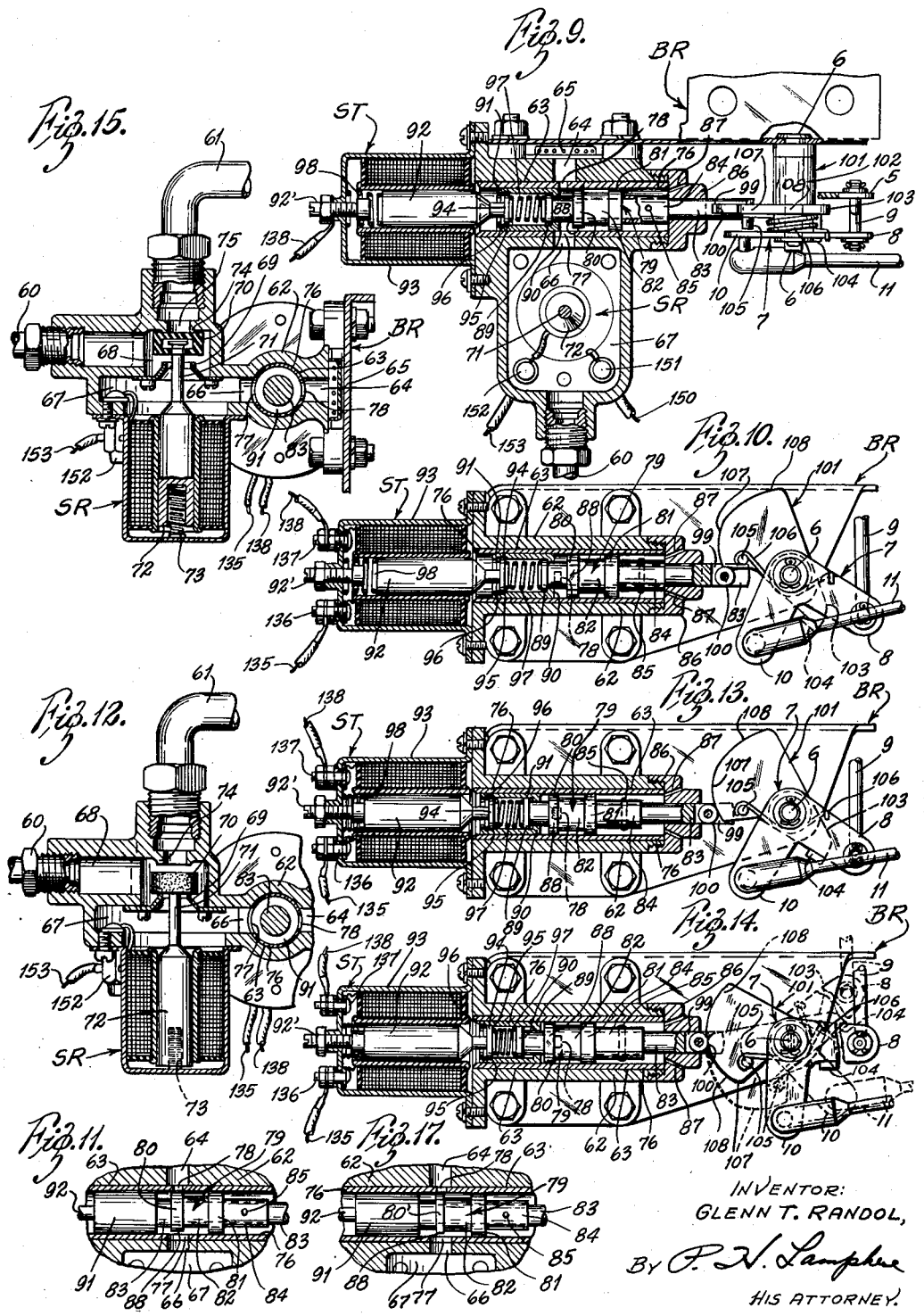
INVENTOR:
GLENN T. RANDOL,
By P. N. Lamphere
HIS ATTORNEY.

Jan. 6, 1953  G. T. RANDOL  2,624,432
AUTOMOTIVE FRICTION CLUTCH
Filed July 18, 1946  8 Sheets-Sheet 6
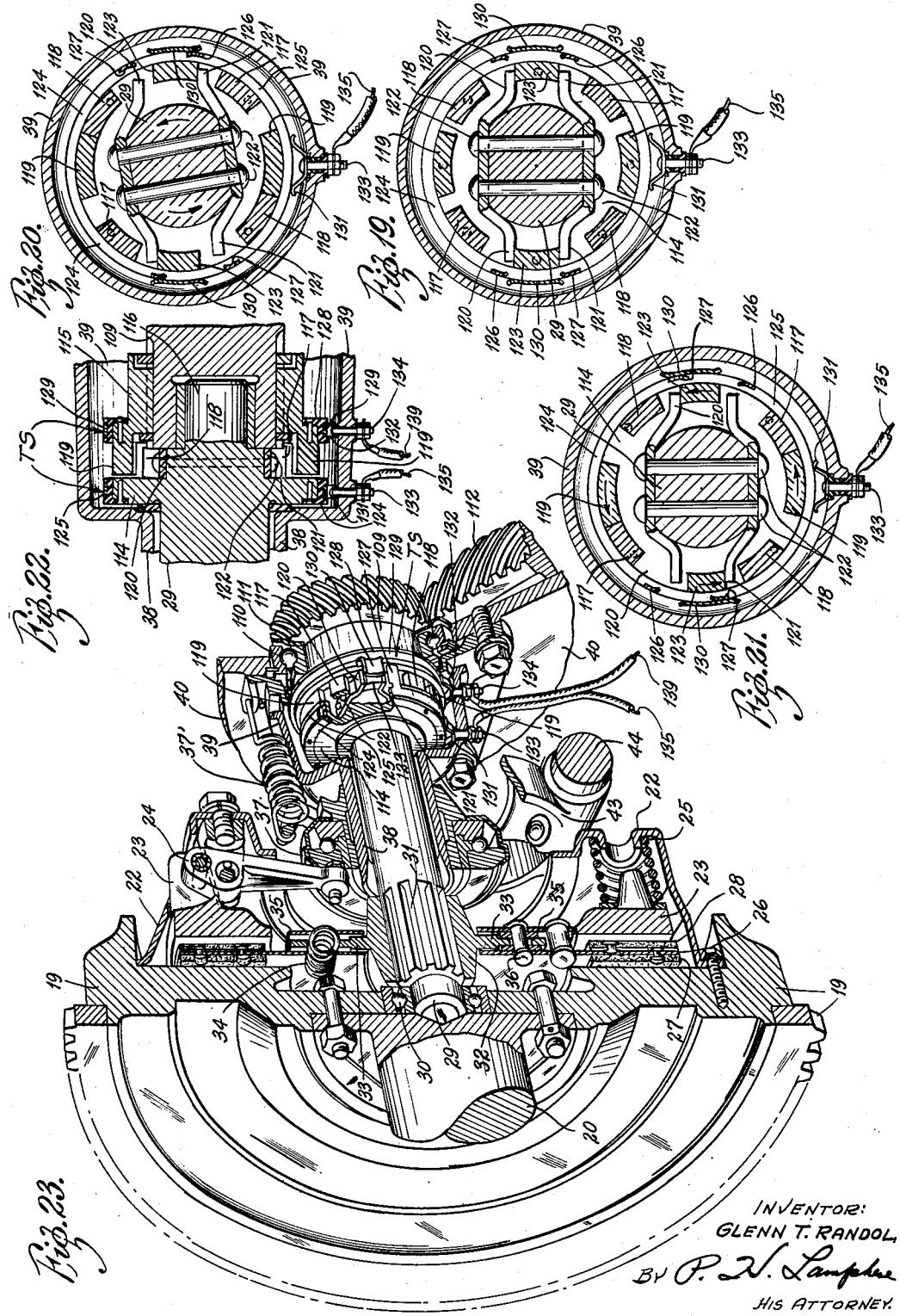
INVENTOR:
GLENN T. RANDOL,
BY P. N. Lamphere
HIS ATTORNEY.

Jan. 6, 1953     G. T. RANDOL     2,624,432
AUTOMOTIVE FRICTION CLUTCH
Filed July 18, 1946     8 Sheets-Sheet 7
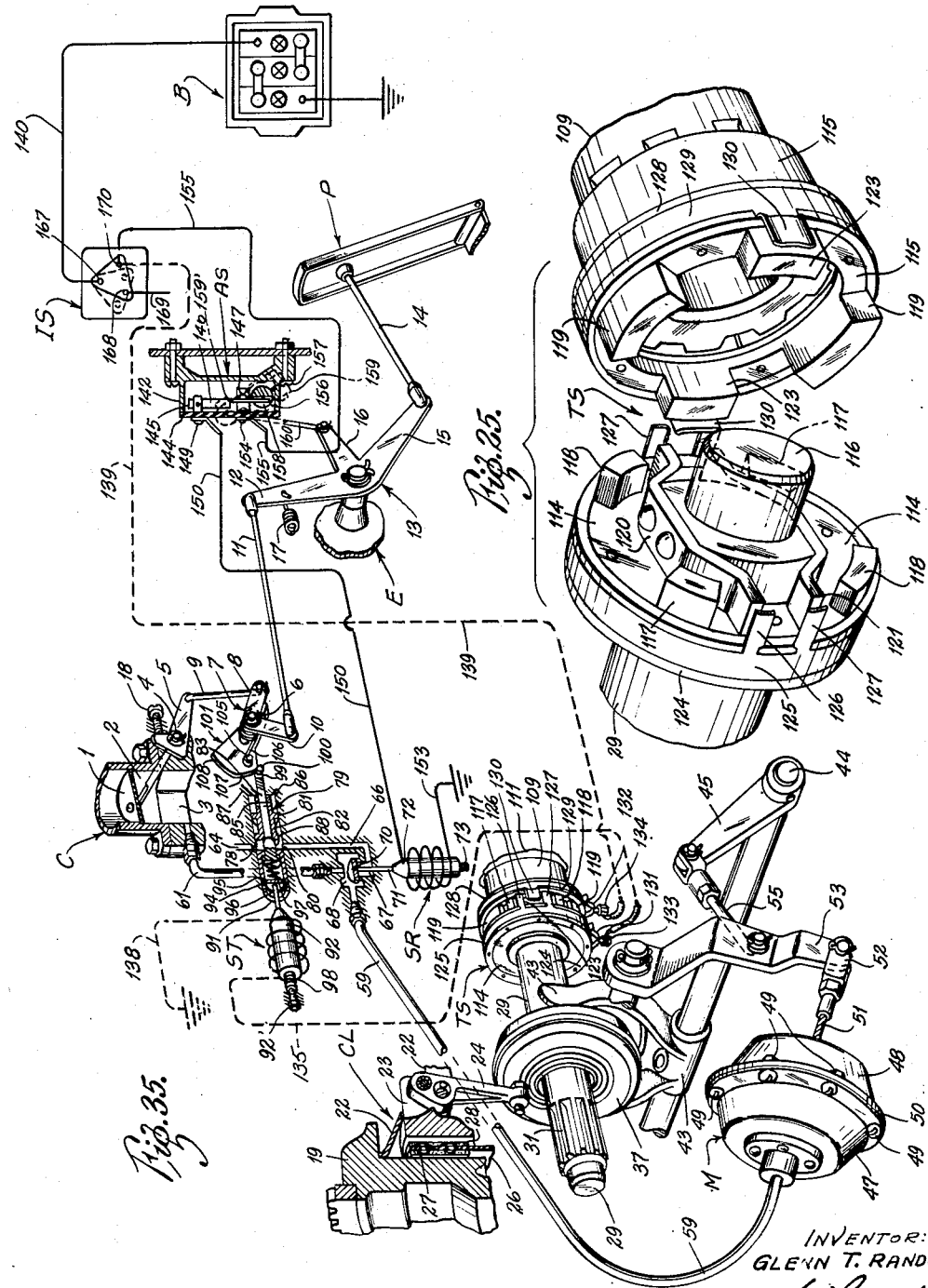
INVENTOR:
GLENN T. RANDOL,
BY P. N. Lamphere
HIS ATTORNEY.

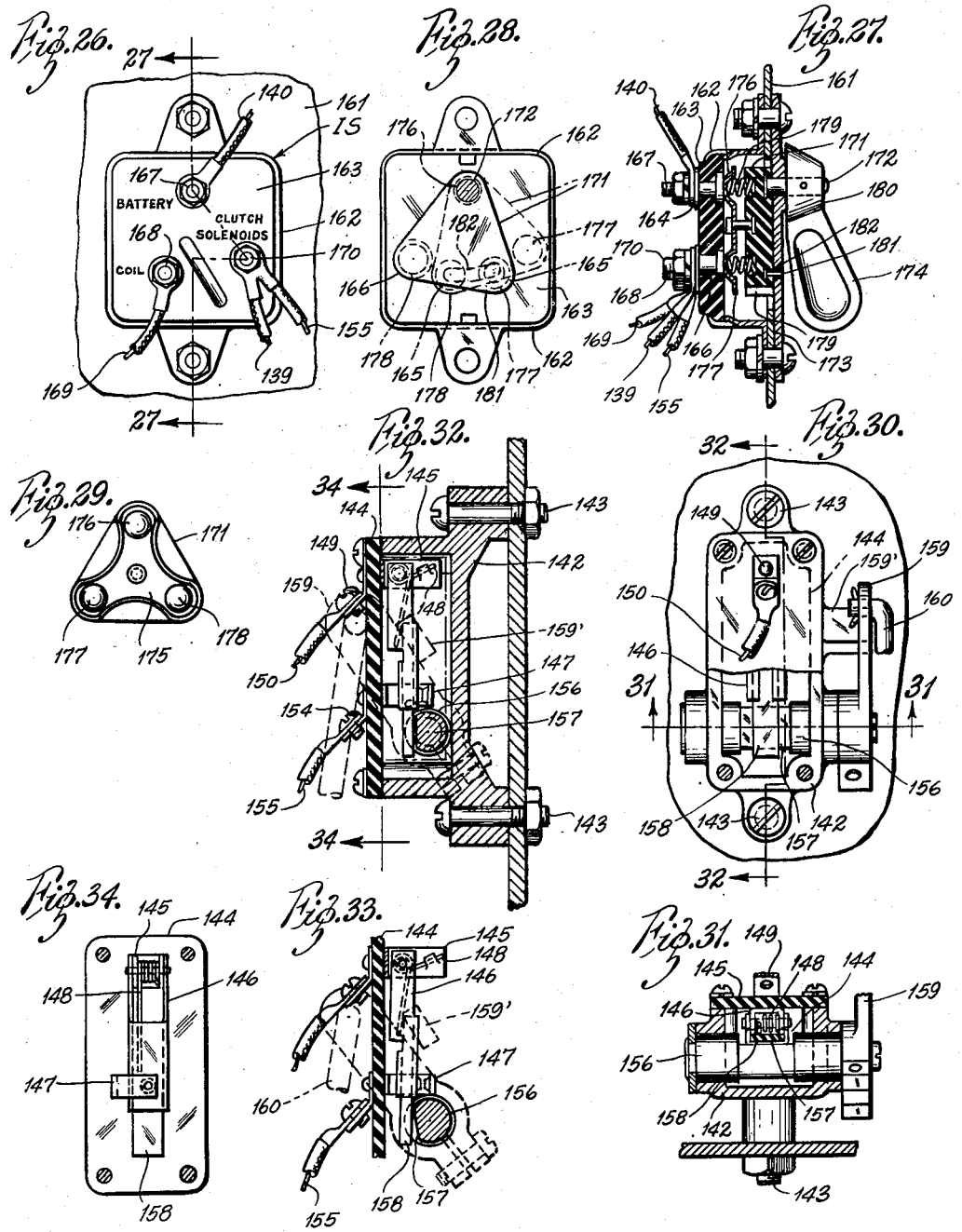

Patented Jan. 6, 1953

2,624,432

UNITED STATES PATENT OFFICE 2,624,432

AUTOMOTIVE FRICTION CLUTCH

Glenn T. Randol, St. Louis, Mo.

Application July 18, 1946, Serial No. 684,465

45 Claims. (Cl. 192—.077)

The present invention relates to power-operated friction clutch mechanisms, and more particularly to correlated functions of personally-operatable means and torque-responsive means for controlling the torque-transmitting elements of such clutches into engagement.

A primary object of my invention is to provide novel automatic torque-detection of the initial engaging point of friction clutch torque-transmitting members upon inauguration of engagement thereof by initial depressing of the accelerator from engine idling position, irrespective of operational modulation of such initial point due to wear, thermal conditions and other factors inherently effective to cause such operational changes in the clutch mechanism.

An object importantly related to the object immediately above is the provision of novel accelerator control means coordinately cooperative with such automatic torque-detection of the initial point of engagement to produce smooth vehicular acceleration from a standing start through the full engine operating range of the accelerator into the economy positive-drive fully engaged clutch condition to simulate the operational characteristics and advantages of conventional fluid-drives.

A further important object of my invention is to provide novel friction clutch control means for automotive vehicles whereby substantial accelerator advancing in an engine accelerating direction is required to inaugurate initial engagement of the clutch mechanism, and wherein such initial engagement is automatically effective to either arrest or retard further engaging action notwithstanding the aforesaid advancement of the accelerator is halted.

Another important object related to the object next above is the provision of novel torque-responsive control means for an engageable friction clutch mechanism, to establish said mechanism in reduced torque transmitting efficiency induced by initial operation of the accelerator.

A further object of the invention is to provide improved control means for a friction clutch which will enable an operator to properly and efficiently control the disengagement of said clutch and its re-engagement.

Another object is to provide means controlled by the torque initially transmitted by a friction clutch for facilitating its engaging action so as to produce a smooth flow of power therethrough under all conditions of operation of the source of power with which said clutch may be associated.

Still another object is to provide means for controlling the engaging of the elements of a friction clutch which is responsive to the torque transmitted by the elements during initial "slipping" engagement thereof.

It is an additional and important object of the present invention to provide means for controlling the engagement of a pair of co-rotatable clutch torque-transmitting elements, the means including members angularly displaceable upon being subjected to the torque transmitted through the elements when initially engaged in partial torque-transmitting efficiency.

A more specific object related to that next above is the provision of power means for controlling the actuation of a pair of clutch elements to full torque-transmitting efficiency and means for controlling the operation of the power means, including an electrical circuit having therein a switch provided with contacts carried by a pair of rotatable members angularly movable relatively with respect to one another under the influence of torque initially transmitted by the clutch elements as the same are brought into initial slipping engagement.

A further object is to embody in a clutch controlling mechanism, novel means responsive to torque transmitted by the clutch frictional elements during initial engagement thereof, and made effective to drive the vehicle by the operation of the accelerator mechanism of an engine with which said clutch is associated for controlling the final engaging operation of said clutch elements after said initial contact.

Yet another object is to provide improved control means for a friction clutch associated with an internal-combustion engine having an accelerator mechanism, which will control the elements of the clutch into initially engaged relation directly by torque upon initial actuation of the accelerator mechanism from released engine-idling position, and controlled to full engagement by the continued actuation of the accelerator mechanism.

A further object is to provide in a control means for controlling engagement of a friction clutch, means responsive to torque transmitted by the elements of said clutch following their initial engagement for arresting or retarding the engaging action of said elements.

Yet a further object is to associate with the arresting or retarding means of the clutch control means a manually operated means for controlling at will the rate of final engaging movement of the clutch elements to fully engaged condition.

A further object is to provide a clutch engaging control means for a friction clutch associated with an engine, which will insure that the speed of the engine will always be maintained at such a value in relation to the torque being transmitted by the clutch elements during engagement that stalling of the engine will be prevented.

Another object is to so combine a friction clutch control structure with a torque responsive device that the clutch will be properly controlled without necessity of any adjustment throughout the life of the clutch facings in its disengaging and re-engaging operations so that a vehicle can be driven efficiently with a minimum of effort and without likelihood of stalling the engine due to lack of torque output in relation to throttle opening position for the load to be moved.

Still another object is to produce an improved control mechanism for a friction clutch actuating power-operated device having a movable element, which has embodied therein an improved valving mechanism so controllable by a predetermined condition of a device responsive to a predetermined torque transmitted through the clutch during initial re-engagement, that said valving mechanism will be effective to produce smooth engagement of the clutch members irrespective of torque input.

A further object is to associate with a control valve mechanism for a power-operated friction clutch actuating means additional mechanism for personally controlling the movement of the power element of the power-operated device after initial clutch engagement has established the transmission of a predetermined torque therethrough.

A further object is to associate with novel control means employed to control a fluid pressure motor during frictional clutch engagement, an internal-combustion engine accelerator mechanism which will, during its depressing movements, complete the final engaging movements of the clutch elements to full operative condition after a predetermined torque is transmitted by the clutch following initial "slipping" contact of its elements.

A further object is to produce a friction clutch control mechanism which will embody combined coordinated control of a motor vehicle clutch by the use of an accelerator mechanism and a torque-responsive device so associated in their functioning that the initial depressing of the accelerator pedal will initiate rapid engaging movements of the clutch elements to the point of initial contact whereby engine torque is transmitted at a predetermined degree to the driven member of the clutch, but insufficient to drive the vehicle except at a possibly "creeping" rate of propulsion provided the roadway terrain is substantially level, which condition automatically causes the torque-responsive means to be effective to arrest further engagement of the clutch elements or to retard the rate of engagement so that stalling of the engine will be prevented in the event the throttle opening and resultant speed of the engine are not sufficient to overcome the load imposed in starting the vehicle.

A further object is to produce a friction clutch control mechanism which will embody means responsive to the torque transmitted by the initial engagement of the clutch so as to obtain a smooth final clutch engagement without any special mode of operation of an accelerator mechanism employed to cause clutch disengagement and inaugurate initial engagement under control of said torque-responsive means, and wherein adjustments to compensate for wear of the various operating parts is entirely eliminated.

A more specific object is to embody in a friction clutch control means operated by a fluid pressure motor, a simple and inexpensive valve means controllable coordinately by the engine accelerator mechanism and a torque responsive means, and which will require no adjustments to compensate for wear, thermal conditions and other factors which cause change of the operational point at which the clutch elements initially engage.

Yet another object is to produce a friction clutch control mechanism for a motor vehicle which will cause quick clutch disengagement upon the full release of the accelerator mechanism of the associated vehicle engine to idling speed position, and wherein initial depressing of the accelerator mechanism will inaugurate rapid movement of the clutch elements toward initial contact position which, and upon assuming a condition to transmit a predetermined torque, will accommodate a desirable relationship to be established between continued clutch engagement and engine speed to produce smooth full clutch engagement.

Still another object of the invention is to provide a fluid pressure operated device for operatively disengaging and controlling re-engagement of a vehicle friction clutch, and to control said device in accordance with certain predetermined conditions of the vehicle engine accelerator mechanism and a torque responsive means.

Other objects of my invention will become apparent from the following description taken in connection with the accompanying drawings showing clutch control structure embodying my invention.

In the drawings:

Figure 4 is a side view of the clutch controlling valve mechanism and related control parts mounted on the intake manifold of the engine;

Figure 5 is a plan view of the structure shown in Figure 4;

Figure 6 is a side view similar to Figure 4, but showing the accelerator slightly depressed for causing the carburetor butterfly valve to open for accelerating the engine and conditioning the clutch operating motor as shown in Figure 2;

Figure 7 is a side view similar to Figure 4, but showing the accelerator pedal in its fully depressed position and the throttle valve of the carburetor in wide open position for conditioning the clutch operating motor so that the clutch is fully engaged as shown in Figure 3;

Figure 8 is a front end view of the control valve on the engine intake manifold as indicated by the line 8—8 of Figure 4;

Figure 9 is a longitudinal sectional view taken on the line 9—9 of Figure 5;

Figure 10 is a longitudinal sectional view taken on the line 10—10 of Figure 4;

Figure 11 is a fragmentary sectional view showing the slidable valve element in the same plane as viewed in Figure 9, but operated to the position assumed when the torque controlled solenoid is energized for causing the clutch driving member to be arrested at its initial engaging point;

Figure 12 is a cross-sectional view taken on the line 12—12 of Figure 4, showing details of the accelerator pedal controlled solenoid actuated valve in its open position for causing the clutch to be fully disengaged;

Figure 13 is a longitudinal sectional view similar to Figure 10, but showing the position the slidable valve element assumes to effect the initial bleeding off action, corresponding to the accelerator position shown in Fig. 2, preparatory to control of the final engaging movements of the clutch, which latter condition is established immediately following the position shown in Figure 11;

Figure 14 is a sectional view similar to Figure 13, but showing the slidable valve element operated by the accelerator to a position wherein the final engaging movements of the clutch elements are completed;

Figure 15 is a cross-sectional view similar to Figure 12, but showing the solenoid valve in closed position assumed on initial depressing of the accelerator pedal to inaugurate the clutch engaging control function of the torque-responsive valve mechanism;

Figure 16 is a perspective view of the slidable valve element;

Figure 1:
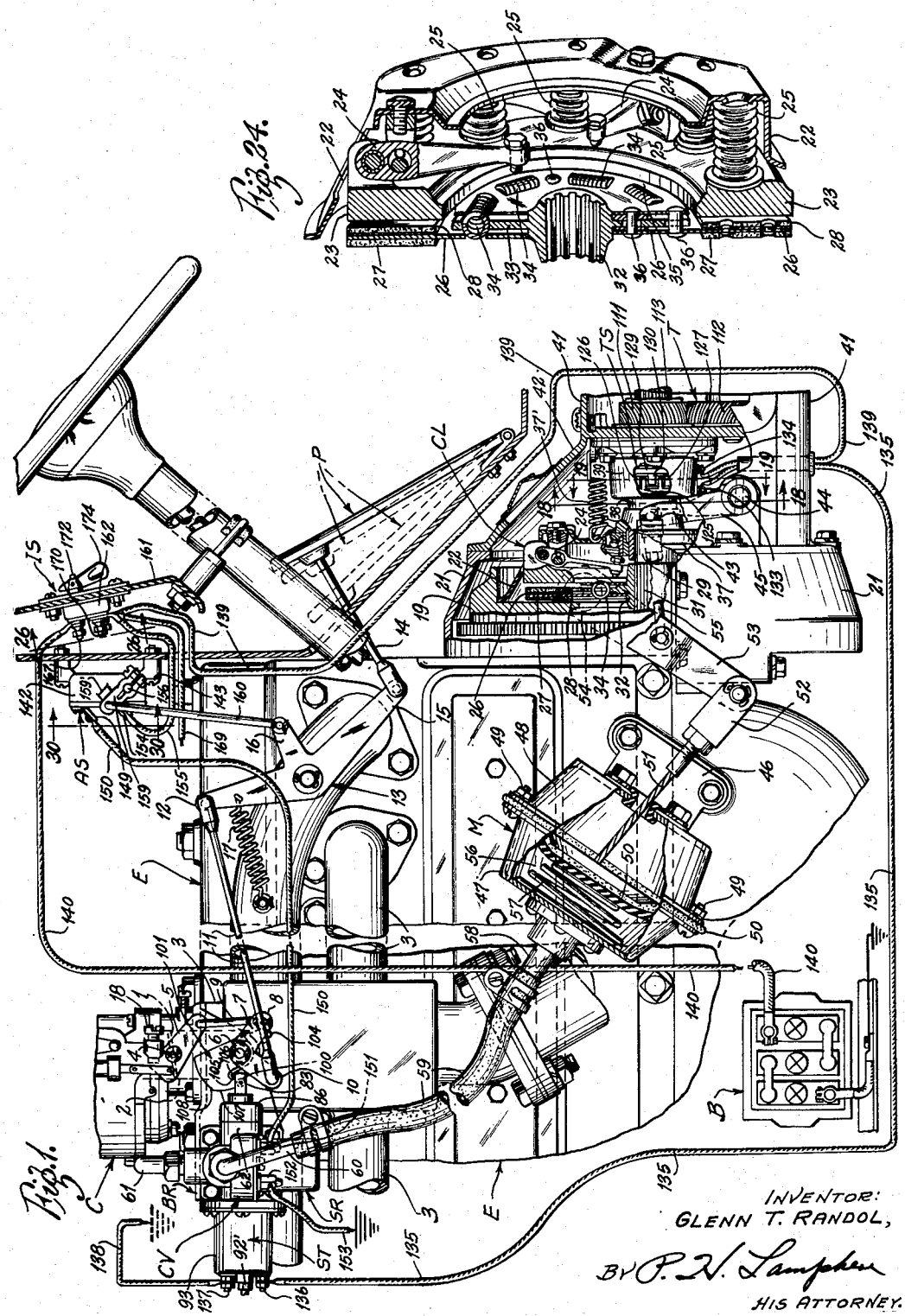
Figure 1 is a side view of a portion of a power plant, such as the internal-combustion engine of a motor vehicle, showing my improved clutch control mechanism associated therewith, the clutch being fully disengaged and the accelerator mechanism of the power plant in engine idling (fully released) position.

Figure 17 is a fragmentary sectional view similar to Figure 11, but showing in modified form the slidable valve element with a flange of such reduced width that it cannot cover the bleeding off port when the torque controlled solenoid is energized, thus enabling the torque condition of the clutch to slow down the engaging movement of the clutch elements, but not suspend their operation at any point of their travel to fully engaged position after the clutch engaging action has been inaugurated by initial depressing of the accelerator pedal;

Figure 18 is an end view of the torque-responsive switch unit, said view being taken on the line 18—18 of Figure 1;

Figure 19 is a cross-sectional view taken on the line 19—19 of Figure 1 and showing details of the torque-responsive switch and lug driving means;

Figure 20 is a view similar to Figure 19, but showing the relation of the parts when the engine is driving the vehicle;

Figure 21 is a cross-sectional view similar to Figure 20, but showing the position of the parts when the vehicle is driving the engine, as for example, in "coasting drive";

Figure 22 is a longitudinal sectional view taken on the line 22—22 of Figure 18 and showing details of the switch elements and the positive clutch lugs associated therewith;

Figure 23 is a perspective view of the engine flywheel clutch assembly and the torque-responsive switch actuated thereby, certain parts being shown in section;

Figure 24 is a perspective view of the friction clutch assembly carried by the engine flywheel and showing details of the driven member, releasing levers, pressure plate and springs associated therewith for engaging the clutch;

Figure 25 is a perspective view of the two elements of the torque-responsive switch showing the switch contacts and the positive clutch lugs for transmitting the torque load;

Figure 26 is a view of the ignition switch taken as indicated by the line 26—26 of Figure 1;

Figure 27 is a vertical sectional view taken on the line 27—27 of Figure 26;

Figure 28 is an interior view of the ignition switch showing the different fixed contacts;

Figure 29 is a view of the ignition switch movable contact element;

Figure 30 is a view of the accelerator pedal operated switch taken on the line 30—30 of Figure 1;

Figure 31 is a cross-sectional view taken on the line 31—31 of Figure 30 showing details of the movable switch contact member and actuating cam;

Figure 32 is a sectional view taken on the line 32—32 of Figure 30;

Figure 33 is a fragmentary sectional view similar to Figure 32, but showing the position of the actuating cam when the movable contact member is operated to open position which corresponds to the first dashed line position of the accelerator as shown in Figure 1;

Figure 34 is a view taken on the line 34—34 of Figure 32 showing the interior of the switch cover and switch contact members carried thereby; and Figure 35 is a schematic view showing details of the electrical control circuits of Figure 1 for controlling the solenoids responsive to operations of the accelerator mechanism and the torque-responsive switch interposed between the vehicle friction clutch driven member and the torque output shaft.

*Engine and carburetor controls*

Referring to the drawings in detail and first to Figure 1, there is disclosed a portion of a motor vehicle (primarily the power plant thereof) having associated therewith clutch controlling mechanism embodying my invention. The power plant shown as an internal-combustion engine "E" has associated therewith a friction clutch "CL" for connecting and disconnecting the engine and the change-speed transmission "T" (partially shown), through which the wheels of the vehicle may be driven at various gear ratios, as is well known practice.

The engine E is arranged to have its speed varied at will by means of a carburetor "C" and the usual accelerating mechanism, including the pedal "P" mounted in the operator's compartment of the vehicle. The carburetor has a butterfly throttle valve 1 situated in the Venturi passage 2 leading to an intake manifold passage 3 of the engine. The butterfly valve is mounted on a pivoted shaft 4 extending to the exterior of the carburetor housing and on this outer end is an actuating lever 5. Below the lever 5 is a pivot pin 6 mounted on a bracket "BR" secured by means of a lateral flange clamped between the carburetor mouting flange and intake manifold and pivoted on this pin is an L-shaped lever 7. One arm 8 of this lever is operatively connected by a rod 9 to the butterfly valve controlling lever 5 and the other arm 10 of this lever is operably connected to an actuating rod 11 extending rearwardly and which, at its rear end, is operatively connected to an arm 12 of a three-armed lever 13 pivoted at any suitable point on the side of the engine. This latter lever is arranged to be actuated by an accelerator pedal "P" situated in the operator's compartment and to accomplish this a rod 14 is operably connected to an arm 15 of said three-armed lever. The third arm 16 of this lever 13 is employed to control a switch generally indicated by the letters "AS" which is a part of my improved controlling mechanism and will be later referred to in detail. The accelerator mechanism is arranged to be biased to its released or engine idling position by means of a spring 17 connected between the engine and the arm 12 of the three-armed lever. This idling position of the accelerator mechanism is determined by means of an adjustable stop 18 comprising a screw cooperating with the butterfly valve controlling lever 5. The depressing of the accelerator pedal from the idling position which is shown in full lines in Figure 1 and Figure 4 will result in opening up of the butterfly valve 1 of the carburetor and allowing an increased flow of fuel to the cylinders of the engine to increase the speed of said engine.

Friction clutch construction

As best shown in Figures 1, 23 and 24 the clutch CL, which is the torque-transmitting friction clutch of the vehicle, is shown as being of a well known design and of the friction type having a single dry disk. This clutch is associated with the flywheel 19 which is secured to the rear end of the engine crank shaft 20 and positioned in the clutch housing 21. The rear side of this flywheel carries a backing plate 22 upon which is movably mounted a clutch pressure plate or driving member 23. This pressure plate is arranged to be controlled by the usual clutch releasing levers 24 (three in number) pivoted to the pressure plate and the backing plate as shown. Between the backing plate and the pressure plate are a plurality of clutch engaging springs 25 (nine in number). Positioned between the rear finished surface of the flywheel and the pressure plate 23 is the single clutch disk 26 which is the driven member of the clutch. This clutch disk is provided with friction facings 27 and 28 on opposite sides of its peripheral portion. By means of these facings the disk is clamped to the flywheel by the action of the pressure plate under the force of the clutch engaging springs 25. The clutch has a driven or pilot shaft 29, the forward end of which is piloted in the flywheel by means of a pilot bearing 30. Adjacent the piloted end, the shaft 29 is provided with splines 31 on which is splined for axial floating movement a hub 32. This hub is arranged to have secured to it the previously referred to clutch disk 26 and this is accomplished by means of a flange 33 on the hub, together with cushioning springs 34. The disk 26 is positioned on one side of the flange 33 and a balancing ring 35 is placed on the other side of the flange. The cushioning springs are carried in slots in the flange and registering slots in the clutch disk 26 and the ring 35 also accommodate reception of these springs. The clutch disk 26 and the ring 35 are held in position adjacent the flange 33 by means of rivets 36 which extend through over size openings in the flange.

In order that the clutch releasing levers 24 may be operated to withdraw the pressure plate away from a position clamping the clutch facings between the finished confronting surfaces on the flywheel and the pressure plate and against the action of the clutch engaging springs to thereby release the clutch, there is provided a clutch throw-out bearing 37 which is mounted for slidable movement on a cylindrical portion 38 of a housing member 39 secured to the forward end wall 40 of the transmission housing 41 which has an integral forwardly extending bell-shaped end portion 42 arranged to be attached to the clutch housing 21 and thus enclose the clutch and the structure between it and the gearing. The cylindrical portion 38 surrounds the pilot shaft rearwardly of the splined end and is spaced slightly from the pilot shaft. A spring 37' acts on the bearing 37 to free it from the levers 24 when the clutch is engaged. The throw-out bearing is arranged to be actuated by a throw-out yoke or fork 43 which is secured to a clutch throw-out shaft 44 transversely journaled in the bell-shaped housing 42 below the pilot shaft 29. The outer end of this shaft 44 carries an actuating arm 45 (see Figures 2 and 3) whereby the yoke can be operated from the exterior of the clutch and the bell-shaped portion of the transmission housing to thus disengage the clutch by moving the pressure plate 23 rearwardly.

Clutch actuating motor and control valve therefor

Figure 2:
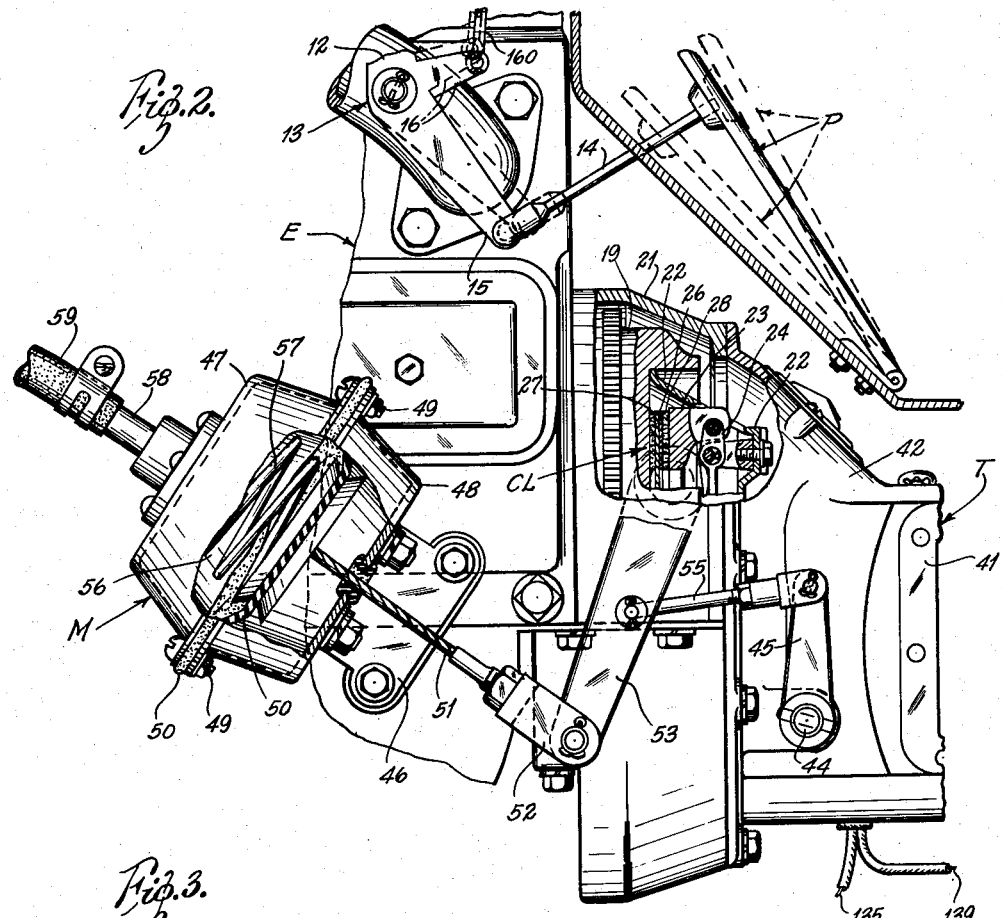
Figure 2 is an enlarged view of part of the structure of Figure 1 showing the accelerator mechanism in a slightly depressed position and the clutch operating fluid motor in a condition wherein the clutch elements are in their initial engaging relation.
Figure 3:
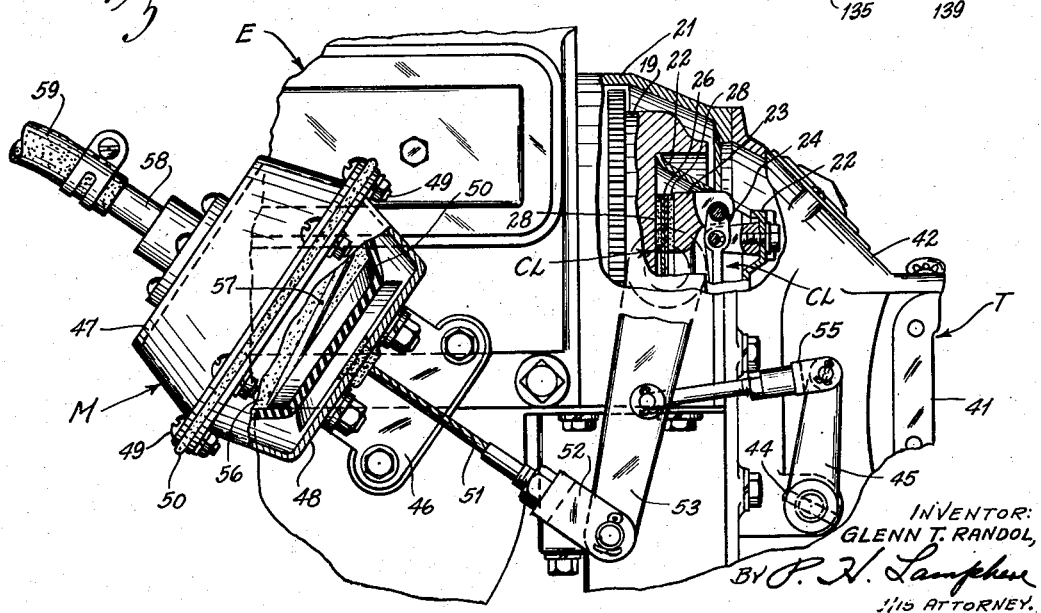
Figure 3 is a view similar to Figure 2 showing the clutch elements in their fully engaged relation.

In the particular embodiment shown of my improved friction clutch control mechanism I employ, for example, a servomotor of the suction type for disengaging the clutch and for controlling its reengagement. The source of fluid pressure different from atmosphere for operating the servomotor or clutch-actuator is produced, for example, in the intake manifold of the engine. This servomotor is generally indicated by the letter M and is secured to the side of the engine adjacent the clutch by means of a bracket 46 as best shown in Figures 1, 2 and 3. The structure of the servomotor employed comprises two pan-shaped casing members 47 and 48 secured together at the rims of their open sides as by bolts 49. Between these rims is clamped the peripheral portion of a flexible diaphragm 50 providing the movable power element of the servomotor. This diaphragm has operably connected thereto one end of a cable 51 which extends through an enlarged central opening in the wall of the rear pan-shaped member 48 and is arranged to be operably connected by a clevis 52 to an arm 53 pivoted at its upper end to the outside of the clutch housing by a pin 54 (shown in dotted lines in Figures 1, 2 and 3 and in full lines in Figure 35). This arm, at a point intermediate its ends, has operably connected thereto one end of a link 55, the other end of which is operably connected to the upper end of the previously referred to arm 45 employed for actuating the clutch throw-out shaft 44 to which the throw-out yoke is secured. The chamber 56 formed by the servomotor diaphragm 50 and the pan-shaped casing member 47 has mounted therein a spring 57 which normally acts upon the diaphragm to insure that it will be moved to its inoperative position to eliminate tension on the clutch actuating mechanism. The chamber 56 is in communication with a tube 58 carried on the bottom of the pan-shaped casing 47 and connected to the tube is a flexible conduit 59 leading to a tube 60 associated with a control valve means forming part of my improved clutch controlling mechanism and which control valve means is generally indicated by the letters "CV." Leading from this control valve means CV is a tube 61 arranged to be connected into the intake manifold passage 3 of the engine at a point below the butterfly valve 1 so that the suction of the engine can be caused to be effective in the tube 61 and also in the chamber of the servomotor under certain operating conditions of the control valve means CV.

The control valve means CV is mounted on the bracket BR and the details of said means is best shown in Figures 5 to 16, to which figures reference is now made. The control valve means has a casing 62 bolted to said bracket and in a portion of this casing is a longitudinal bore 63. A passage 64 places this bore in communication with atmosphere through a breather cap 65. Diametrically opposite this atmospheric passage 64 is a passage 66 leading into a chamber 67 in another portion of the casing to one side of that provided with the bore 63. This chamber 67 is adjacent a second chamber 68 to which the tube 60 is connected, which tube, it will be recalled, is connected to the servomotor M. Between the chambers 67 and 68 is a ported valve seat 69 in which a double acting valve element 70 is adapted to cooperate. This valve element is provided with a stem 71 which connects it with the plunger 72 of a solenoid "SR" attached to valve casing 62 and arranged to be energized and de-energized in response to operating the accelerator mechanism, as will become later apparent. The plunger of the solenoid is biased by means of a spring 73 to a position wherein the valve element 70 is off the seat 69 and engaged with its other seat 74 surrounding a passage 75 leading to the tube 61, already referred to, which is connected into the intake manifold of the engine. When the solenoid SR is de-energized the spring 73 will insure that the valve element 70 will be off the seat 69 and on the seat 74, as shown in Figure 15, to establish communication between the chambers 67 and 68 so that air can enter the tube 60 and pass to the fluid motor M, provided air at atmospheric pressure is present in the chamber 67. When the solenoid SR is energized the valve element 70 will be moved from the position shown in Figure 15 to the position shown in Figure 12 wherein the valve element will engage the seat 69 and be off the seat 74 and thereby prevent any communication between the chambers 67 and 68. This position of the valve element will, however, open up to passage 75 and place the tube 60 and the clutch operating fluid motor in direct communication with the intake manifold through the tube 61 so that the subatmospheric pressure present in the intake manifold will also be present in the chamber 56 of the fluid motor. When such condition occurs the servomotor will be operated and by means of the described connecting linkage with the clutch mechanism operably cause the clutch to be disengaged.

Referring again to the bore 63 in the valve casing, there is situated therein the slidable valve means for controlling the engagement of the clutch after such is inaugurated by closing the solenoid controlled valve SR as shown in Figure 15. Within the bore 63 is press fitted a cylindrical sleeve or lining 76 having a port 77 overlying the passage 66 of the same size. There is also a smaller port 78 on the opposite side for cooperation with the passage 64 so that air under certain conditions can flow from passage 64 to the passage 66. Slidably mounted within the cylindrical lining is a spool valve element 79 having a forward annular flange 80, a rear annular flange 81 and a reduced central land portion 82. The spool valve element is mounted on a rod 83 and in order that the rod and the spool valve element may be secured together to move as a unit, the rear flange 81 carries a rearwardly extending integral sleeve 84 which is secured to the rod by a pin 85. The sleeve 84 is also adapted to abut against the cap 86 which closes the end of the bore 63 and also acts as a stop to limit the rearward movement of the rod 83 and the spool valve element. In order that there may be atmospheric pressure at all times in the space at the rear of the annular flange 81 of the spool valve element, the cap is provided with a breather opening 87. The forward annular flange 80 of the spool valve element is of a width just slightly greater than the port 78 so that this flange can completely close off the port, as will be apparent from the position of the spool valve element shown in Figure 11. The side of the flange 80 adjacent the port 77 of the lining is provided with a flat land 88, as can be best seen from the perspective view of the spool valve element as shown in Figure 16. The purpose of this flat is to maintain the port 77 and passage 66 in communication at all times with both sides of the forward annular flange 80 of the spool valve element so that irrespective of the extent to which the annular flange opens port 78, air can flow to port 77 and passage 66.

The forward end of the rod 83 is adapted to extend beyond the forward end of the spool valve element and at the end of this extension is an annular flange 89 for cooperation with the inwardly extending flange end 90 at the rear end of a sleeve 91 slidably positioned in the forward end of the cylindrical lining. This sleeve is assembled onto the rod 83 before the spool valve element is fixed to the rod. The forward end of the sleeve 91 is arranged to be connected and actuated by a plunger 92 of a solenoid generally indicated by the letters "ST," the casing 93 of which is secured to the forward end of the valve casing 62. The plunger 92 is operably connected to the sleeve by means of an annular flange 94 which is adapted to be held against an annular shoulder 95 at the forward end of the sleeve by means of a snap spring 96. Thus the sleeve and plunger always move as a unit.

Within the sleeve 91 and interposed between the annular flange 94 on the end of the plunger and the annular flange 89 on the end of the rod, which is situated within the opposite end of the cylindrical lining, is a coil spring 97 of predetermined tension. This spring normally maintains the flange 90 in engagement with the annular flange 89 on the end of the rod 83, but capable of yielding so that the rod 83 and the spool valve element 79 may move relatively with respect to the sleeve 91 under certain clutch-controlling conditions to be hereinafter described in detail. The plunger of the solenoid is acted upon by a spring 98 which is of less strength than the spring 97 in the sleeve 91 and when the solenoid is not energized, this spring 98 is capable of moving sleeve 91, the rod 83 and the spool valve element on the rod as a unit to their rearmost position, as shown in Figures 9 and 10, which positions are determined by the engagement of the integral sleeve 84 on the rear end of the spool valve element with the cap 86.

If the solenoid ST should be energized so that the plunger 92 is moved forwardly, to the position shown in Figure 13 for example, then the spring 98 will be compressed and the plunger will pull the sleeve 91, the rod 83 and the spool valve element forwardly as a unit and the relationship of the various parts with respect to each other and also the relationship of the parts of the spool valve element to the ports 77 and 78 will be such that the forward flange 80 of the spool valve element will cover the port 78 as is shown in Figure 11. To obtain the proper covering of this port under the conditions referred to, the solenoid plunger has associated therewith an adjustable stop screw 92'. This screw need only be given one adjustment and that when assembly is made. When this position of the spool valve element is brought about by the energizing of the solenoid it will not, however, prevent continued forward relative movement of the rod 83 and the spool valve element with respect to the sleeve and plunger 91, 92, respectively, since such is accommodated by a compressing of the spring 97 which is situated within the sleeve 91 connected to the solenoid plunger. Both Figure 13 and Figure 14 illustrate operated positions wherein the spool valve element and the rod 83 have been moved forwardly relative to the sleeve 91. When the spool valve element is moved forwardly the forward annular flange 80 will begin to pass over the port 78 (Figure 13) and thus enabling air to enter through the port from atmosphere and then flow out through the port 77 and passage 66 and thence to the fluid motor M in an apparent manner. The volume of air capable of passing through the port 78 can be varied at will by the extent of forward movement of the spool valve element. Figure 14 shows port 78 completely open. The purpose of this permissible continued forward sliding movement of the spool valve element, after port 78 is closed by energization of solenoid ST, is to accommodate variable bleeding in of air to the servomotor to thereby control the rate of final re-engagement movements of the clutch elements, as will be further elaborated upon in connection with the operation of my improved clutch controlling mechanism as a whole.

The rear end of the rod 83, which extends out of the cap 86, is provided with a longitudinal slot 99 in which is mounted a roller 100. The slot 99 is arranged to receive a cam arm 101 which is mounted by means of an integral sleeve 102 on the pin 6, already referred to, and having pivoted thereon the L-shaped lever 7 which forms a part of the mechanical linkage between the accelerator pedal P and the butterfly valve 1 of the carburetor. The cam arm 101 is rotatably mounted on the pin and is arranged to be moved positively in one direction only by the L-shaped lever. To accomplish this the cam arm 101 carries an extension 103 provided with a laterally extending flange 104 which is arranged to underlie the arm 8 of the L-shaped lever. Thus if there should be rotation of the L-shaped lever in a clockwise direction, as viewed in Figures 1 and 10 for example, the cam arm 101 will be positively moved with the L-shaped lever 7 and the connected accelerator mechanism linkage.

The cam arm 101 is so constructed and positioned with respect to the rear end of the rod 83 that when the solenoid ST is de-energized with the rod 83, together with the spool valve element, is at the extreme rearward position as shown in Figures 9 and 10, the end of the rod will lie beneath a pin 105 carried on the side of the cam arm so that this cam arm cannot be rotated while the rod 83 is so positioned. However, if the solenoid should be energized and the spool valve element, together with the rod 83, are moved forwardly to the positions shown in Figure 11, then the end of the rod will be moved from beneath the pin 105 so that the cam arm is free to be rotated and moved through the end of the slot 99 beyond the roller, as is illustrated in Figures 13 and 14. In all axial positions of the rod 83, as shown in Figures 10–14 inclusive, the cam arm extends slightly into the roller slot to thus prevent turning of rod 83 and the spool valve element.

The movement of the cam arm 101 is accomplished by the depressing of the accelerator pedal to open the butterfly valve, and the mechanical connection between the cam arm and the accelerator mechanism is accomplished by means of a torsional spring 106, one end of which is hooked over the arm 8 of the L-shaped lever and the other end of which is hooked over the pin 105 on the side of the cam arm. With this torsional spring it is possible for the cam arm to be prevented from movement by the engagement of pin 105 with the end of rod 83, yet the accelerator mechanism can be actuated relatively so as to open the butterfly valve of the carburetor. The torsional spring arrangement also insures that as the butterfly valve is opened by the accelerator mechanism, a greater stored up energy will be placed in the spring to cause rotation of the cam arm whenever it is freed for operation as a result of the rod 83 being moved initially forwardly.

The cam arm is employed to actuate the spool valve element 79 independently of any actuation thereof by the solenoid, and this separate actuation is controlled by cam surfaces 107 and 108 on the outer edge of the cam arm. The cam surface 107, which is adapted to operate first upon the roller 100 to move the rod 83, is eccentric with respect to the pivotal axis of the cam arm, whereas the cam surface 108, which also acts on the roller 100 following that of cam surface 107 is concentric with respect to the axis of the cam arm. With such an arrangement it is therefore possible to actuate the rod 83 and the spool valve element by the cam arm only when the cam surface 107 is cooperating with the roller 100. This cam surface 107 is shown to be operative upon the roller 100 for approximately thirty to forty percent of the full permissible travel of the cam arm, which permissible travel corresponds to the travel of the L-shaped lever 7 of the accelerator mechanism when said accelerator mechanism is moved from its released position to its full throttle open position.

The tension of the torsional spring 106 bears a direct relationship to the tension of the spring 97 positioned within the sleeve 91 and which latter spring must be overcome to move the spool valve element forwardly relative to the sleeve 91 after the solenoid ST has been energized. The torsional spring 106 is not strong enough to move the spool valve element against spring 97 when in its normal pre-tensioned condition; that is, the condition existing when the flange 104 on the extension of the cam arm is in engagement with the arm 8 of the L-shaped lever, as would be the case when the accelerator pedal is fully released in engine idling position. Thus, even though the solenoid may be energized and the roller end of the rod 83 moved from a locking position beneath the pin of the cam arm, there will be no forward movement of the rod 83 and the spool valve element by the cam surface 107 acting on the roller 100 until the torsional spring 106 is given a tension greater than its normal tension. This greater tension will be accomplished by operation of the accelerator mechanism in a direction to open up the butterfly valve and speed up the engine. A sufficient tension will be obtained to cause the cam arm to rotate and move the spool valve element forwardly when the accelerator has been depressed about thirty to forty percent of its full permissible travel to cause full butterfly valve open position. When the torsional spring is sufficiently tensioned to operate the rod 83 and the spool valve element, the operation will be slow due to the contour of the cam surface 107 and consequently the spool valve element will have a slow forward movement which is that desired to accomplish the proper bleeding in of air under atmospheric pressure to the fluid motor M to obtain smooth clutch engagement.

*Torque-controlled device*

The solenoid ST, which operates the slidable spool valve element, is adapted to be energized only after a predetermined torque has been transmitted by the initial engaging of the clutch members or elements, which torque while normally insufficient to drive the vehicle from a standstill except possibly at a "creeping" rate of propulsion may be adjusted to hold the vehicle from a roll-back on upgrades as will hereinafter be fully explained. This predetermined torque is selected to occur upon initial torque transferring contact of the clutch faces with the pressure plate and the flywheel surface. To accomplish this novel clutch controlling operation, I have provided a specially designed torque-controlled device shown by way of example, as a switch which is generally indicated by the letters "TS" and is interposed between the driven member 26 and shaft 109 of the clutch CL. This clutch driven or transmission driving shaft 109 is mounted in the forward end wall 40 of the transmission housing 41 by means of a bearing 110. The rear end of the shaft 109 carries the usual transmission driving gear 111 which is in constant mesh with a countershaft gear 112, as is the well known arrangement. Also in the transmission there is the driven shaft 113 (Figure 1) and the usual change-speed controlling gearsets and clutches on this driven shaft and countershaft, further details of which are not shown nor described since they constitute no part of the present invention.

The torque-controlled switch TS is shown in detail in Figures 19 to 23 and 25 and reference is now made to these various figures. The rear end of the driven member shaft 29 is provided with an annular flange 114 and the forward end of the driven shaft 109 has splined thereon for rotation therewith an annular confronting member 115. In order that these two driven shafts may be maintained in proper alignment, the rear end of the shaft 29 is provided with a reduced extension 116 which is piloted in the forward end of the driven shaft 109, as best shown in Figure 22. The flange 114 on the shaft 29 is provided with two pair of axially projecting driving lugs 117 and 118 and arranged to be positioned between each pair of these lugs is a larger driving lug 119 extending from the member 115 on the driven shaft 109. Lug 119 is of less width than the distance between the lugs 117 and 118 to provide predetermined relative movement between the shaft 29 and the driven shaft 109 in either direction of rotation. In order that each lug 119 may be centered between the lugs 117 and 118 so that there will be the same predetermined relative movement in either direction from said centered clutch-disengaged position, there is provided, for example, on the shaft 29 two torque yielding pre-energized leaf springs 120 and 121, said springs being secured to the shaft by rivet pins 122, as can best be seen in Figures 19 to 21. The corresponding ends of these leaf springs are spaced apart and received between each pair of spaced ends is a lug 123 carried by and extending axially from the member 115 on the driven shaft 109 in a manner similar to the driving lugs carried by said member. With this provision of the torque yielding leaf springs it is seen that there must be a yielding of these springs in order that the cooperating driving lugs can be brought into engagement so that the torque transmitted can be increased beyond that accommodated by the leaf springs prior to and during deflection thereof. Since the shaft 29 is being driven through the clutch from the engine it is see from Figure 20 that one end of the leaf spring 120 and the opposite end of the leaf spring 121 will yield until the driving lug 118 engages the driving lug 119. If the driven shaft 109 leading to the transmission should become the driving member, a condition which would occur, for example, in "coasting" drive during shifting from a higher speed to a lower speed in descending a grade with the vehicle, then the other ends of the leaf springs would yield as the clutch engages until there would be a driving condition existing between the lugs 119 and the lugs 117, as is illustrated in Figure 21.

The transmittable torque necessary to additionally stress the leaf springs as accommodated by the relative movement between the shafts 29, 109 is employed to close a switch which forms part of the electrical circuit for energizing the solenoid ST, already referred to. This switch comprises an insulative ring 124 secured, as by pinning, on the periphery of the flange 114 of the driven member shaft 29 and embedded in this insulative material is a collector ring 125 of conducting material. On diametrically opposite sides of the collector ring there projects axially a pair of integral circumferentially spaced contacts 126 and 127. In a somewhat similar manner the member 115, splined on the forward end of the shaft 109, has secured thereto, as by pinning, a ring of insulative material 128 in which is embedded a collector ring 129 of conducting material and axially projecting from diametrically opposite sides of the collector ring are single contacts 130, each of which is arranged to lie between and be out of contact with spaced contacts 126 and 127 on the collector ring carried by the shaft 29, when the torque yielding leaf springs are not additionally stressed or loaded by a transmission of torque as best shown in Figures 19 and 23. It is important to note here that the weight of the torque-springs 120—121 determines the amount of torque transmittable by the clutch frictional members in partially engaged "slipping" condition, during the limited relative movement of the clutch driven member 26 and the driven shaft 109 to actuate the torque-device TS to establish the clutch members in said drive "slipping" condition.

As best shown in Figure 23, the collector ring 125 has riding thereon a brush 131 carried by the previously referred to housing 39 secured to the forward end wall 40 of the transmision housing as by cap bolts. In a like manner the collector ring 129 has riding thereon a brush 132, also carried by said housing 39. These two brushes are provided respectively with terminals 133 and 134. As best shown in Figures 1 and 23 and the wiring diagram in Figure 35 in which latter view energized circuits are shown in solid lines and de-energized circuits in dash lines, the terminal 133 is connected by an electrical conductor 135 with one terminal 136 of the winding of the solenoid ST already referred to. The other terminal 137 of this winding of the solenoid is connected by a conductor 138 with ground. The terminal 134 for the brush 132 is connected by a conductor 139 directly with an ignition switch, generally indicated by the letters "IS" and to be later referred to in detail. This ignition switch controls the electrical circuit of the vehicle, as is well known, there being a conductor 140 coming to the switch from a grounded battery "B".

It is seen from the foregoing that the torsional switch TS, comprising the spaced contacts 126 and 127 carried by the shaft 29 and the contacts 130 carried by the driven shaft 109, together with the torque yielding leaf springs, controls the energization of the solenoid ST. Whenever contacts 130 engage contacts 126 the circuit will be closed. This will occur only when the torque being transmitted is such as to cause yielding of the leaf spring and sufficient relative movement between the driven shafts 29 and 109 to bring the contacts 130 into engagement with the contacts 126 as shown in Figure 20. A similar closing of the circuit will occur when the contacts 127 and 130 are engaged, as would happen under certain conditions where the clutch is being engaged with the vehicle wheels as the torque source. The engaged condition of contacts 127 and 130 is shown in Figure 21. Whenever the circuit for the solenoid ST is established by required torque transmitting conditions, the spool valve will be moved immediately to the position shown in Figure 11, thus cutting off all communication between the atmosphere and the suction motor M.

Accelerator-controlled switch

As already previously mentioned the solenoid SR, which controls the double acting valve element 70 for causing clutch disengaging operation by the servomotor M and the controlling of the initial and final re-engaging stages of said clutch is under the control of the accelerator mechanism. This control is accomplished by means of an accelerator-controlled switch "AS" which is mounted on the firewall 141, as is shown in Figure 1. The details of this accelertaor controlled switch AS are shown in Figures 32 to 34 and reference thereto is now made. The switch has an open sided box 142 secured to the firewall by bolts 143. The open side of the box is closed by a cover plate 144 made of suitable insulative material. This cover carries an extension 145 of conducting material upon which is pivoted a movable contact element 146 for cooperation with a fixed contact 147, also carried by the cover. A suitable spring 148 normally biases the movable contact into engagement with the fixed contact. The extension 145 is connected to an external terminal member 149 and a conductor 150 leads from this terminal member to the terminal 151 from the solenoid SR. The other terminal 152 of this solenoid is connected by a conductor 153 with a suitable ground such as the engine of a vehicle. The fixed contact member 147 of the switch AS has a terminal 154 which is connected by a conductor 155 to an ignition switch "IS" to be controlled thereby.

The switch AS, as already mentioned, is to be controlled by the accelerator mechanism and to accomplish this the switch box has mounted therein a shaft 156 which is provided with a cam surface 157 for cooperation with an insulated extension 158 of the movable contact 156. By means of the cam and the extension the movable contact can be moved from its closed position against the bias of its closing spring to open position. On the outer end of the shaft 156 is secured an arm 159 and a link 160 operably connects this arm to the third arm 16 of the three-armed lever 13 forming a part of the accelerator mechanism linkage between the accelerator pedal P and the butterfly valve 1 of the carburetor. The connection between the accelerator mechanism and the switch AS is so arranged that when the accelerator pedal P is in its fully released position (idling condition of the engine) the movable contact 146 will engage the fixed contact 147 and the switch AS will be closed, thus energizing the circuit for the solenoid SR and causing this solenoid to be operative to move the valve element 70 off from the seat 74 and onto the seat 69 so that the servomotor M can be directly connected with the intake manifold of the engine. This will cause operation of the servo-mechanism "M" and result in the full disengagement of the clutch. When the accelerator mechanism is operated from its released position by a slight depressing of the accelerator pedal and before any appreciable speedup of the engine occurs, the connection between the accelerator mechanism and the switch AS will cause an opening of the switch, that is, a disengagement of the movable contact 146 from the fixed contact 147. This will break the circuit for the solenoid SR and the plunger thereof will then be moved by spring 73 so that the double acting valve element 70 will be placed in the position shown in Figure 15 which will result in the servomotor being disconnected from the intake manifold and connected through the chambers 67, passages 65 and 64 to atmosphere to accommodate the flow of air from atmosphere from the servomotor to be under the control of the spool valve element 79 already described. The switch AS remains open under all operative conditions of the accelerator mechanism and is only closed when the pedal of the accelerator mechanism is in fully released (engine idling) position.

Ignition switch

The ignition switch IS is of well known construction and is illustrated in detail in Figures 26 to 29. This switch IS is mounted on the instrument panel 161 in the driver's compartment of the vehicle, as probably best illustrated in Figure 1. The ignition switch has a casing element 162 secured to the instrument panel and is provided on its back surface with an insulative panel 163. This insulative panel is provided with three fixed contacts 164, 165 and 166. The contact 164 is provided with a terminal 167 to which the conductor 140, already referred to and coming from the battery B, is connected. The fixed contact 165 is provided with terminal 168 to which a conductor 169 leads to the ignition coil and other units comprising the ignition system of the engine (not shown). The third fixed contact 166 is provided with terminal 170 to which the two previously referred to conductors 139 and 155 are connected, the former coming from the brush 134 of the torque switch TS, already described, and interposed between the engine friction clutch and the change-speed transmission, said switch TS forming a part of the circuit of the solenoid SR already described. Within the switch box is a triangular shaped movable block of insulative material 171 which is secured at the upper corner by a pivot pin 172 extending through a closure plate 173 and having mounted on its exposed end the ignition switch actuating lever or button 174 accessible to the operator of the vehicle. The block of insulative material 171 carries a triangular shaped plate 175 of conducting material having three extruded contact buttons 176, 177 and 178 for cooperation with the fixed contacts 164, 165 and 166, respectively. The contact button 175 is arranged to be in constant engagement with the fixed contact 164, whereas the contact buttons 177 and 178 are arranged to be movable simultaneously onto the contacts 165 and 166 or out of engagement therewith. The springs 179 interposed between the plate 176 and the block 171 biases the buttons into a position for making proper contact. The button plate 176 is connected at its center to the block by a pin 180.

The block also carries a pin 181 movable in a slot 182 of the plate 173 for limiting the swinging movement of the block and the button carrying plate to provide a definite "open" and "closed" condition of the switch contacts. When the ignition switch is closed; that is, the lever 174 turned to a position wherein the contact buttons 177 and 178 engage, respectively, the fixed contacts 165 and 166, the ignition switch will be closed so that electrical energy from the battery can flow to the ignition circuit and to the circuits of the clutch control mechanism, provided said circuits are in closed condition. The closed position of the ignition plate 176 is shown by full lines in Figure 28. When the insulating block 171 and the plate 176 are swung to the dotted line shown in Figure 28 the ignition switch will be open.

Operation

Referring to the operation of my improved clutch control mechanism, let it first be assumed that the accelerator pedal P is fully released so that the butterfly valve 1 of the carburetor C is in its closed idling position of the engine. Under such conditions the clutch CL will be disengaged and this is brought about by energization of the clutch-actuator in response to the closing of the accelerator switch AS which is closed only when the pedal P is fully released. When this switch AS is closed, the solenoid SR will be energized and the double acting valve element 70 thereof will be actuated to the position shown in Figure 12 which will result in the chamber 56 of the servomotor M being placed in direct communication with the intake manifold of the engine. Differential fluid pressure will then be effective on the movable diaphragm 50 of the servo-mechanism to cause it to be moved to the position shown in Figure 1, thereby moving the pressure plate 23 of the friction clutch CL rearwardly by the connecting linkage and releasing or opening the clutch so that no power can be transmitted therethrough from the engine. When the accelerator mechanism is released the solenoid ST will not be energized and, therefore, the spool valve element 79 will be in the position shown in Figures 9 and 10 which position will admit air under atmospheric pressure to the chamber 67, but which cannot flow therefrom to the fluid-pressure motor M due to the valve 70 being seated on the valve seat 69. The reason that the solenoid ST is not energized is because the torque-responsive switch TS, interposed between the clutch and the change-speed gearing, is not closed to cause energization of the solenoid circuit. The torque responsive switch TS is open because no torque is being transmitted therethrough (clutch CL disengaged) and, therefore, the torque yielding leaf springs maintain a normal relationship between the clutch shafts 29 and 109 which insures that the torque switch contacting elements will be open as illustrated in Figure 19.

If it should now be desired to re-engage the clutch CL, as for example when starting the vehicle from a stopped position with a low speed drive established or after changing a gear ratio of the gearing when the vehicle is moving, all that needs to be done is to depress the accelerator pedal P. The initial depressing of this accelerator pedal will cause the accelerator switch AS to be opened. Upon opening of the switch AS the solenoid SR will be immediately de-energized and the spring 73 acting on the plunger 72 thereof will also immediately place the double acting valve element 70 in the position shown in Figure 15 whereby the suction present in the intake manifold will be cut off from the fluid motor M. Simultaneously with the cutting off of the source of suction, the fluid motor will be connected to atmosphere due to the unseating of the element 70 from the seat 69. This connection to atmosphere from the fluid motor will then be through the conduit 59, tube 60, chamber 68, chamber 67, passage 66, port 77, port 78, passage 64 and through the breather cap 65, the spool valve element 79 still remaining in the position shown in Figures 9 and 10. The rate of flow of air under atmospheric pressure to the fluid motor M will be controlled by the cross-sectional area of the port 78. As air under atmospheric pressure enters the chamber 56 of the fluid motor, the differential fluid pressures acting on the diaphragm 50 of the fluid motor will begin to equalize and consequently the diaphragm will be moved to the right as viewed in Figure 1, thus releasing the clutch engaging springs 25 to expand and move the pressure plate 23 in a direction to cause initial clamping of the clutch facings 27 and 28 between said pressure plate and the clutching finished surface of the engine flywheel. This re-engaging action of the clutch will continue in the aforesaid manner irrespective of the extent of operating the accelerator pedal in an engine accelerating direction until initial engagement of the clutch is reached. During the depressing of the pedal of the accelerator mechanism for speeding up the engine, the spool valve element 79 will not be moved since the cam arm 101 is prevented from being moved by the operation of the accelerator mechanism, due to the fact that the roller end of the rod 83 is under the pin 105 carried by the cam arm. The accelerator mechanism is free to be moved, however, due to the interposition of the torsional spring 106 between the L-shaped lever 7 of the accelerator linkage and the cam arm 101. This movement of the accelerator mechanism does nothing more than accelerate the engine with attendant increase in the tension of the torsional spring.

As the clutch is operated toward fully engaged condition, there will first occur an initial clamping action of the clutch facings between the clutch pressure plate 23 and the flywheel 19 which will result in some torque being transmitted by the clutch but only sufficient to cause the vehicle to possibly move at a "creeping" rate if not on an upgrade, in which latter condition, the vehicle could be prevented from a "rollback" by properly adjusting the accelerator in an engine accelerating direction. The clutch now begins to pick up the load on the wheels of the vehicle and as it picks up this load there will be "slipping" action between the clutch faces and the flywheel surface and the pressure plate. Upon initial engagement of the flywheel 19 and the pressure plate 23 with the friction faces of the clutch disk 26, the "cushioning" springs 34 will modulate as torque is transmitted from the driving shaft 20 through the positive-drive lugs 117, 118 and 119, 123 of the driven shafts 29, 109. The damping springs 34 thus serve only to "cushion" the drive force applied through the clutch CL. The springs 34 being heavier than the torque-rated deflection springs 120, 121 of the switch proper, the degree of torque transmittal necessary to actuate the switch TS is truly determined by the springs 120, 121 and need not be necessarily sufficient to drive the vehicle. From the foregoing statement it will be appreciated that the springs 34 do not constitute a functional part of the torque-controlling system of the present invention, inasmuch as the actuation of switch TS may be as efficiently and as expeditiously carried out solely by the torque-rated springs 120, 121 in the absence of the springs 34. Actually, the effective functional purpose of the illustrated springs 34 is the "cushioning" of the clutch elements to eliminate transferal of shock load to the vehicle drive line upon abrupt application of torque-load either by the engine or coasting drive. When the torque transmitted by the initial engaging action of the clutch reaches a degree which is sufficient to cause a yielding of the torque yielding leaf springs 120 and 121 forming a part of the torque-responsive switch TS, the shaft 29 of the clutch will have relative movement to the shaft 109 leading to the transmission and the driving lugs 119 will be moved to engage the driving lugs 118, all as viewed in Figure 20. This will result in a closing of the torque-responsive switch TS by a placing of the contacts 126 in engagement with the contacts 130. When this switch closes the circuit including the solenoid ST will be immediately energized. When this circuit is energized the solenoid ST will also be energized and cause the plunger 92 to be shifted from the position shown in Figure 9 to the position shown in Figures 13 and 14. This movement of the plunger, upon energization of the solenoid, will immediately result in the sleeve 91, together with the spool valve element 79 and the rod 83, being moved to the position shown in Figure 11 wherein the forward annular flange 88 of the spool valve element will be positioned to cover the port 78. Air from the atmosphere will immediately be prevented from flowing to the chamber 56 of the servomotor M and the movement of its diaphragm 50 will be arrested, thus stopping the engaging action of the friction clutch CL. The arrested position of the diaphragm of the fluid motor and clutch elements is shown in Figure 2. The movement of the rod 83 by the plunger 92, upon energization of the solenoid ST, will result in the roller end of the rod 83 being moved out from beneath the pin 105 on the cam arm 101, thus releasing this arm so that it can move downwardly under action of the torsional spring 106 through the slot 99, and cause its eccentric cam surface 107 to operate upon the roller 100 carried in the slot 99 at the end of the rod.

If the accelerator mechanism has been moved to such a position in speeding up the engine that the tension of the torsional spring 106 is sufficient to cause movement of the rod 83 by its cam surface 107, then the rod 83 will begin to be slowly moved to the left from the position shown in Figure 11 to a position substantially that shown in Figure 13. If the torsional spring is not tensioned sufficiently to cause this movement, then some additional depressing of the accelerator pedal may be necessary, but sufficient tension of the spring 106 to move rod 83 by the cam arm should be present when the accelerator has been depressed a substantial amount, as for example thirty to forty percent of its full permissible throttle travel movement thus ample power is always provided from the engine to prevent stalling upon initial engagement of the clutch by having the accelerator advancing in an engine accelerating direction with such initial engaging action.

As the spool valve element 79 is moved from the position shown in Figure 11 to the position shown in Figure 13, the port 78 will be "cracked" and air from the atmosphere will again be admitted through the port 78 around the forward annular flange 80 of the spool valve element and then to the chamber 56 of the fluid pressure motor M. This admission of additional air under atmospheric pressure to the fluid motor will slowly tend to further equalize the pressures acting on the diaphragm 50 which will then gradually move rearwardly from the position shown in Figure 2 toward the position shown in Figure 3 in controlling the clutch engaging springs 25 to apply additional pressure to the pressure plate 23 and thereby clamp the clutch facings with greater intensity between the pressure plate and the flywheel. As the diaphragm moves slowly rearwardly in the fluid motor, the clutch elements will slowly assume their final engaging relation wherein the clutch engaging springs 25 exert their maximum pressure and the clutch is considered fully engaged. The position of the diaphragm of the fluid motor M, when the clutch is fully engaged is as shown in Figure 3.

It is to be particularly noted in connection with the controlling of the re-engagement of the clutch that the rate of engagement of the final engaging movements of the clutch elements will be controlled by the extent and rate of depression of the accelerator mechanism. If it should be desired to cause the clutch to very slowly engage, following the movement of the diaphragm of the fluid motor M being arrested (Figure 2), which occurs when the torque-responsive switch TS is closed (Figure 20) and the solenoid ST energized to move the spool valve element 79 to the position shown in Figure 11, then the accelerator mechanism will be slowly opened, thus so "cracking" the port 78 that there will be a slow bleeding in of air under atmospheric pressure to the chamber of the fluid motor and a correspondingly slow equalization of the pressures acting on opposite sides of the diaphragm 50 of the fluid motor M so that the diaphragm will slowly control the clutch elements into their fully engaged relation. Such an operation of the accelerator mechanism to obtain regulated full engagement of the clutch will probably be desirable when the vehicle is being started in a low speed gear from a standstill.

If it should be desired to have a quick final re-engagement of the clutch after the torque-responsive switch TS is closed, then such can be obtained by a further and more rapid depressing of the accelerator mechanism so that the port 78 can be quite rapidly uncovered to its full open condition as, for example, the condition illustrated in Figure 14. Under such operations of the accelerator there will be a bleeding in of the air to the fluid motor M at a greater rate of flow, thus resulting in the diaphragm 50 of the fluid motor M moving at a correspondingly greater rate of speed resulting in a faster engagement of the clutch elements.

In connection with the operation of my improved clutch controlling means, it is to be particularly noted that the extent of depressing of the accelerator mechanism will have no effect on the rate and/or extent of re-engagement of the clutch elements at any time prior to the clutch elements reaching a point in their engagement following initial contact of the elements whereby the torque transmitted is sufficient to cause a closing of the torque-responsive switch TS. The clutch will always be controlled to engage at the same rate of movement from its fully disengaged position to a position following initial contact of the clutch elements irrespective of the manner in which the accelerator mechanism is manipulated, since this rate of engagement is always controlled by the volume of air admitted into the fluid motor M through the port 78 which is fully open. The extent of movement to effect initial contact is out of the control of the operator after initiation of such movement, since movement to initial engagement is effected by the clutch-engaging springs 25. The extent of depressing of the accelerator mechanism, however, will always have a controlling effect on the rate of re-engagement of the clutch elements after initial engagement of the clutch elements following the closing of the torque-responsive switch TS since such extent of depressing of the accelerator mechanisms will determine the extent of uncovering of the port 78.

It is also to be noted that with my clutch controlling mechanism the speed of the engine will always be "leading" the clutch engagement and thus it will have sufficient power to insure that the load of the vehicle will be picked up without any stalling of the engine. This feature of my clutch control mechanism is accomplished by the torsional spring connection 106 between the accelerator mechanism and the cam arm 101 which operates the spool valve element 79 controlling the volume of air under atmospheric pressure admitted to the servomotor M during the re-engagement of the clutch. The torsional spring 106 is not normally so tensioned that it is capable of moving the spool valve element, but becomes so tensioned to cause movement of said valve element when the accelerator mechanism has been depressed a considerable extent to cause an increase in speed of the vehicle engine. If the accelerator mechanism should be depressed completely to the floorboard during clutch re-engaging, then the torsional spring 106 will be so additionally tensioned that immediately upon the clutch transmitting sufficient torque to close the torque-responsive switch TS and causing energization of the solenoid ST, the cam arm and spool valve element 79 will immediately be operated to fully uncover the port 78 so that there will be substantially no arresting movement of the clutch elements during their initial engaging operation to full engagement. The condition of the spool valve element 79 during this operation is illustrated in Figure 14. In this connection it is also seen that during the final movements of the accelerator mechanism to full butterfly valve open position, there will be no movement of the spool valve 79 as during such movements the concentric cam surface 108 is operating on the roller 100 at the end of rod 83.

It is further to be particularly noted in connection with my clutch controlling mechanism that the arresting movement of the clutch elements during engagement always occurs whenever there has been sufficient initial contact of the elements to transmit a predetermined torque which, while not necessarily sufficient to normally drive the vehicle, may be adjusted by varying the weight of the torque-springs 120—121 to cause the vehicle to "creep" on level terrain or to maintain the vehicle at a standstill on an upgrade with the accelerator advanced in an engine accelerating direction to simulate the torque transmitting "slip" characteristics of a fluid-coupling or torque-converter. Therefore, it can be said that arresting movement occurs at the same point during clutch engagement, irrespective of the extent of wear of the clutch faces and without the necessity of any manual or automatic adjustments; as the sole factor which brings about the arresting or retarding movement of the clutch elements in initial engaging contact is controlled solely by a predetermined torque transmitted by the clutch and this torque condition is constant irrespective of any wear of the clutch elements. Upon properly installing the control mechanism in a vehicle there will be no necessity for any maintenance adjustments and it will operate in a uniform and efficient manner throughout the service life of the clutch to give the desired smooth clutch engagement under all torque-load conditions imposed thereon. The mechanism will function to give either a fast or slow rate of final engagement of the clutch according to the engine controlling position of the accelerator mechanism following a fixed controlled engaging operation by torque effective after initial contact of the clutch elements notwithstanding the clutch faces may be new or substantially worn out.

When it is desired to disengage the clutch at any time, this is accomplished by merely fully releasing the accelerator pedal. This causes the cam arm 101 to be returned to its position shown in Figure 10 under a positive movement of the L-shaped lever 7 due to the arm 8 of said lever picking up the cam arm 101 through the flange 104. The valve rod 83 and the spool valve element 79 will then be enabled to return to their positions shown in Figure 10, but this will not occur until the clutch has been disengaged and the torque-responsive switch opened so that the solenoid ST is de-energized. The suction motor M is activated to disengage the clutch upon release of the accelerator mechanism as the released position of the mechanism will result in the switch AS being closed and the solenoid SR energized. When such condition occurs the double valve element 70 will be placed in the position shown in Figure 12 wherein the intake manifold will be connected to the fluid motor M and the fluid motor disconnected from atmosphere. When the intake manifold is connected to the fluid motor, its diaphragm will be moved forwardly to a position shown in Figure 1 wherein the clutch is fully disengaged.

If the clutch CL should be disengaged, as for example when the vehicle is descending a grade and it is desired to change the gear ratio condition of the associated gearing to a lower speed, the clutch control mechanism will nevertheless operate in the same manner as already described during re-engagement of the clutch in starting the vehicle. When it is desired to re-engage the clutch under the aforementioned conditions, the accelerator pedal will be depressed, thus causing the valve element 70 to be placed in the position shown in Figure 15 wherein air will flow to the fluid motor M and it will be controlled to regulate the clutch to initially engage under the action of the clutch engaging springs 25. Immediately after the clutch elements initially contact, torque will begin to be transmitted through the clutch. The direction of transmission of torque, however, will be from the wheels of the vehicle to the engine (coasting drive) since the driven shaft 113 of the transmission will be driven by the wheels of the vehicle at a greater speed than the engine crankshaft. When the torque transmitted is great enough to cause yielding of the torque yielding leaf springs 120 and 121, the driving lugs 117 and 119 will engage, as shown in Figure 21, thus bringing into engagement the contact elements 130 and 127 to close the torque-responsive switch TS and energize the solenoid ST. The result will be that the spool valve element 79 will be placed in the position shown in Figure 11 so that the engaging movement of the clutch elements will be arrested and the final engaging movements of the clutch elements to full engaged condition controlled in accordance with the extent and/or rate of depressing of the accelerator mechanism in the same manner as already described. Thus it is seen that irrespective of the direction in which torque is being transmitted through the clutch after initial engagement of the clutch elements, there will always be available the same control of the clutch elements to final engagement. By providing for the control of the clutch when torque is being transmitted therethrough in a direction toward the engine crankshaft, it will be possible to properly control the engagement of the clutch so as not to abruptly "pull up" the vehicle under the conditions referred to; that is, the down-shifting to a lower speed in going down a grade. By constructing the torque-responsive switch TS so that it is closed by either engine or coasting torque transmission through the clutch, a clutch controlling mechanism is obtained which will be operative under all conditions of vehicle operation. It is important to note here that clutch re-engagement following gear ratio changing during "coasting" drive may be accomplished without sensing the function of the torque-responsive switch, by uninterrupted accelerating movement of the pedal P.

The point during engagement of the clutch, after initial engagement of the clutch elements, at which it is desired to have the torque-responsive switch TS closed, can be varied as desired by merely changing the strength of the torque yielding leaf springs 120 and 121. If it should be desired that the torque-responsive switch TS close almost substantially with initial contact of the clutch elements during clutch engagement, these springs will be made quite weak. If it is desired to have the clutch elements transmit, in a "slipping" engaged relation, a substantial amount of torque to close switch TS after they initially contact, then of course the leaf springs 120 and 121 will be made to have a greater strength.

It may be desired to have the clutch controlling mechanism embodying my invention provide for no definite arresting of the movement of the clutch elements during engagement and after they initially contact. In place of the arresting point it may be best to have merely a retarding point in the engaging movement of the clutch elements blending with continued accelerating movement of the accelerator P whenever a predetermined torque is being transmitted after initial contact of the clutch elements; that is, an establishment of a predetermined minimum rate of retardation. If this retarding is desired, it can be accomplished merely by a slight change in the construction of the spool valve element 79. The necessary change involves merely the decreasing of the width of the forward annular flange 80 of the spool valve element 79, as is shown in Figure 17 by the reference numeral 80'. By decreasing the width of this flange the complete covering of the port 78 will be eliminated at the time the torque-responsive switch TS is closed. If the port 78 is never fully covered, air flowing to the chamber 56 of the suction motor M during clutch re-engagement will not be entirely stopped, but will merely be "choked down"; that is, establishing a minimum flow of air to the fluid motor. The extent of "choking" can be varied as desired by varying the width of said forward annular flange 80' of the spool valve element. When the spool valve element is caused to be moved by the accelerator through the torsional spring 106, after assuming the position shown in Figure 17, the port 78 will be increasingly uncovered to thus vary the rate of the final engagement of the clutch elements. With the spool valve element of Figure 17 functioning when the clutch is initially engaged, the diaphragm of the fluid motor M will not be arrested in its movement from the position shown in Figure 1 to the position shown in Figure 3, but will merely slow down and have a minimum rate of retardation when it reaches the point shown in Figure 2 wherein the torque-responsive switch TS is closed and the spool valve element 79 placed in the position shown in Figure 17. Whether the arresting spool valve element of Figure 11 or the retarding spool valve element of Figure 17 is employed, there nevertheless will be a change in rate of the movement of the clutch elements toward full engaged condition at their initial engaging point. In one case the change in rate is such that there will be an arresting of the movements of the clutch elements while in the other case there will merely be a slowing down of the rate of movement of the clutch elements; but in both cases, initial engagement is followed by gradually accelerated movements to final engagement in accordance with the manipulation of the accelerator mechanism. In the controlling of the clutch control mechanism, both the arresting and retarding functions blend into final engaging movements which are controlled by the accelerator mechanism.

Clutch engagement is inaugurated by an operator-responsive, accelerator-actuated means through a first movement thereof; engaging movement of the clutch friction elements or members, up to establishment of a predetermined "slipping" torque transferal relation, is under the control of mechanism directly responsive to torque conditions within the clutch and independent of further accelerator movement; and final engaging movement of the clutch friction elements is again placed under accelerator control movable through a second movement thereof upon actuation of the aforesaid torque-responsive mechanism to operating position. In this manner, the critical period of clutch element movement into partially engaged condition is controlled independently of vehicular operating conditions and/or accelerator manipulation following the inauguration of the clutch friction members into said partially engaged relation, while accelerator control of the overall rate of clutch engagement is maintained to suit the individual desires and driving habits of the operator. Thus, accurate and uniform clutch control to "slipping" and into fully engaged conditions, are always available irrespective of the extent of wear on the clutch parts or vehicular operating conditions, according to the operator's mode of driving.

It will be understood that other modifications and variations will be readily apparent to those skilled in the art from the preceding description of presently preferred embodiments of the invention which are for illustrative purposes only, and it is not intended to limit the invention in its broader aspects except as set forth in one or more of the claims appended hereto:

2,624,432

25

I claim as my invention:

1. In control mechanism for a clutch having a plurality of frictionally engageable elements for transmitting torque from an internal-combustion engine drivingly connected thereto and controlled by an accelerator; means including a fluid pressure-operated motor controlled by valve means, connected to a source of fluid pressure different from atmospheric pressure for disengaging the clutch; means for controlling the re-engagement of the clutch comprising valve means having a valve element; means responsive directly to torque transmitted by said clutch elements during initial engagement thereof for placing said valve element in an operating condition to cause said motor to perform its said controlling functions, said last named means comprising a solenoid for operating said valve element, an electrical circuit for said solenoid including a switch closed when the torque transmitted by said clutch exceeds a predetermined value.

2. In clutch controlling mechanism, means for disengaging the clutch elements, means for controlling re-engagement of said elements comprising means responsive to the torque transmitted by the elements after initial contact of the elements during re-engagement for controlling relative movement of the elements toward full engagement, and means for varying the rate of engagement to full engagement after the torque responsive means becomes operative.

3. In clutch controlling mechanism, means for disengaging the clutch elements and means for controlling re-engagement of the clutch elements comprising means responsive to the torque transmitted by the elements after initial contact of said elements during re-engagement for retarding the continued relative movement of the elements toward full engagement, and means controlled at will for varying the rate of retardation after said retarding means becomes effective.

4. In clutch controlling mechanism, means for disengaging the clutch elements and means for controlling re-engagement of the clutch elements comprising means responsive to torque transmitted by the elements after initial contact of said elements during re-engagement for establishing a predetermined minimum rate of retardation of the engaging movements of the elements, and means controlled at will for increasing the rate of retardation after the minimum rate has been established.

5. In clutch controlling mechanism, a manually controlled member, means operable by said member when in a predetermined position for causing the clutch elements to be disengaged and when moved from said predetermined position for controlling re-engagement of said elements, said controlling means including means responsive to torque transmitted by the clutch elements after initial contact and by continued movement of the manually controlled member from said predetermined position for varying the rate of re-engagement of the clutch elements to full engaged condition.

6. In controlling mechanism for a clutch, means including a fluid pressure actuated motor operable for disengaging the clutch and controlling said clutch during re-engagement thereof, a source of pressure fluid to actuate said motor, and means for controlling the fluid motor to control the rate of clutch re-engagement comprising a valve element, a solenoid for moving the valve element to a controlling position, an electrical circuit for energizing the solenoid including a switch arranged to be closed only when the clutch elements during re-engagement are transmitting a torque greater than a predetermined value, and manual means for additionally moving the valve element after being placed in its controlling position to thereby cause varying of the rate of final engagement of the clutch elements.

26

7. In controlling mechanism for a clutch associated with an engine having an accelerator mechanism, means for disengaging the elements of the clutch and controlling their re-engagement including means responsive to torque transmitted by the clutch elements after initial contact for altering the rate of engagement, and means operable by the accelerator mechanism following the operativeness of the torque responsive means for varying the rate of engagement to full engagement.

8. In controlling mechanism for a clutch associated with an engine having an accelerator mechanism, means controlled by the release of the accelerator mechanism for disengaging the elements of the clutch and by depressing the accelerator mechanism for effecting the control of re-engagement of the elements, means responsive to torque transmitted by the clutch elements after initial re-engagement together with the operating of the accelerator mechanism for controlling the rate of engagement of the elements to full engagement, said operation of the accelerator mechanism being effective to control the rate of engagement only after the torque responsive means is caused to be effective.

9. In controlling mechanism for a clutch associated with an engine having an accelerator mechanism, means for disengaging the clutch and effecting its control thereof during re-engagement, and means for controlling the re-engagement of the clutch elements comprising means responsive to torque transmitted by the clutch elements after initial engagement for causing said controlling means to be operative, and means energized by movement of the accelerator mechanism to increase the speed of the engine for varying the controlling means, after being made operative, to thereby vary the rate of final engagement of the clutch elements.

10. In controlling mechanism for a clutch associated with an engine having an accelerator mechanism, means for disengaging the clutch and controlling its re-engagement, said means for controlling the re-engagement of the clutch elements comprising means responsive to torque transmitted by the clutch elements after initial engagement for causing said controlling means to be operative, and means comprising spring means energized by movement of the accelerator mechanism to increase the speed of the engine for varying the controlling means, after being made operative, to thereby vary the rate of final engagement of the clutch elements, said spring means being sufficiently energized to vary the controlling means only after the accelerator mechanism has been moved through a considerable portion of its engine speed increasing movement.

11. In a mechanism for controlling the re-engagement of a clutch, the combination of a fluid pressure-actuated motor operably connected to disengage the clutch elements and control their re-engagement, a source of pressure fluid to actuate said motor, conduit means for conveying fluid flow to the motor during re-engagement, valve means associated with the conduit means, means operable in response to torque transmitted by the clutch after initial engagement of the clutch elements for controlling the valve means to change the rate of engagement of the clutch element, and means operable at will after said torque responsive means becomes operable for controlling the rate of engagement of the clutch elements to full engagement.

12. In clutch controlling mechanism, a fluid pressure-actuated motor operably connected to a movable element of the clutch means including valve means for causing the fluid motor to disengage the elements of the clutch and control their re-engagement, a manually-controlled member, means for controlling said valve means by the manually-controlled member so that the clutch will be disengaged when the member is in a predetermined position and will be released to re-engage when moved from said predetermined position, means associated with the valve means for controlling the rate of engagement of the clutch elements and comprising means responsive to torque transmitted by the clutch elements after initial engagement including means operable by a continued movement of the manually-controlled member beyond the position effecting initial re-engagement of the clutch elements.

13. In a mechanism for controlling the re-engagement of a clutch associated with an engine having an accelerator mechanism, the combination of a fluid pressure-actuated motor operably connected to disengage the clutch elements and control their re-engagement, conduit means for conveying fluid flow to the motor during re-engagement, valve means including a valve element associated with the conduit means, means operable in response to torque transmitted by the clutch after initial engagement of the clutch elements for moving said valve element to a position to change the flow of fluid through said conduit means, and means operable by the accelerator mechanism after said valve element assumes said last-named position for varying the size of the opening through which fluid flows to the motor.

14. In controlling mechanism for a clutch associated with an engine having an accelerator mechanism, means including a fluid pressure-actuated motor and valve means for disengaging the clutch and controlling said clutch during its re-engaging, said means for controlling the re-engagement of the clutch comprising valve means having a movable valve element, means for moving the valve element to an operative position including means responsive to torque transmitted by the clutch after initial engagement of the elements thereof, and means operable by the accelerator mechanism only when the valve element has been placed in its said operative position for moving said valve element from its said operative position so as to vary its controlling function and thereby vary the rate of final engagement of the clutch elements.

15. In controlling mechanism for a clutch associated with an engine having an accelerator mechanism, means including a fluid pressure-actuated motor and valve means for disengaging the clutch and controlling its re-engaging, said means for controlling the re-engagement of the clutch comprising valve means having a valve element, means responsive to torque transmitted by the clutch elements after initial engagement for placing its valve element in an operative condition to perform its controlling functions, cam means operable only after the valve element is placed in an operative condition for moving said valve element to vary its operative condition and thereby vary the rate of final engagement of the elements of the clutch, and means energized by the movement of the accelerator mechanism to speed up the engine for moving the cam means, the magnitude of energization of said last-named means being increased in relation to the increase in engine speed.

16. In controlling mechanism for a clutch associated with an engine having an accelerator mechanism, means including a fluid pressure-actuated motor for disengaging the clutch and controlling its re-engagement, said means for controlling the fluid motor to control the rate of clutch re-engagement comprising a valve element, a solenoid for moving the valve element to a controlling position, an electrical circuit for energizing the solenoid including a switch arranged to be closed only when the clutch elements during re-engagement are transmitting torque greater than a predetermined value, and means operable by the movement of the accelerator mechanism in speeding up the engine but only after the valve element has been placed in its controlling position for moving said valve element to thereby cause varying of the rate of the final engagement of the clutch elements.

17. In controlling mechanism for a clutch associated with an engine having an accelerator mechanism, means comprising a fluid pressure-actuated motor operably connected to move one of the clutch elements, a source of fluid pressure different from atmospheric pressure, valve means normally connecting the motor to fluid at atmospheric pressure, a solenoid for operating the valve means, an electrical circuit for the solenoid including a switch, means for closing the switch by the accelerator mechanism when released to thereby cause the solenoid to operate the valve and connect the source to the fluid motor to disengage the clutch and for opening the switch and de-energizing the solenoid to allow the valve means to connect the motor to the fluid at atmospheric pressure to thereby control clutch re-engagement, valve means for controlling communication between the motor and the fluid at atmospheric pressure, and means responsive to torque transmitted by the clutch elements after initial engagement thereof for causing the last named valve means to be placed in its controlling condition.

18. In controlling mechanism for a clutch associated with an engine having an accelerator mechanism, means comprising a fluid pressure-actuated motor operably connected to move one of the clutch elements, a source of fluid pressure dfferent from atmospheric pressure, valve means normally connecting the motor to fluid at atmospheric pressure, a solenoid for operating the valve means, an electrical circuit for the solenoid including a switch, means for closing the switch by the accelerator mechanism when released to thereby cause the solenoid to operate the valve and connect the source to the fluid motor to disengage the clutch and for opening the switch and de-energizing the solenoid to allow the valve means to connect the motor to the fluid at atmospheric pressure to thereby control clutch re-engagement, valve means for controlling communication between the motor and the fluid at atmospheric pressure, means responsive to torque transmitted by the clutch elements after initial engagement thereof for causing the last-named valve means to be placed in its controlling condition, and means operable by the accelerator mechanism only after the said last named valve means is placed in its controlling condition for varying the controlling function of the valve means.

19. In a mechanism for controlling the re-engagement of a clutch having torque transmitting elements relatively movable to a plurality of engaged positions of varying torque-transmitting effciency for imposing a varying torque-load on a driven member; the combination of a source of fluid under pressure different from that of the atmosphere, a fluid motor connected to said source to operatively disengage the clutch elements and control their re-engagement, a conduit means for accommodating fluid flow to the motor during re-engagement, valve means interposed in the conduit means and actuatable to interrupt and establish fluid flow therethrough, and means including a first member rotatable with said driven member and a second member relatively angularly movable with respect to said first member under the influence of that torque-load imposed on said driven member by the clutch after initial partially effective engagement of the clutch elements for actuating the valve means to interrupt the flow of fluid through said conduit means and thereby limit the extent of movement of the clutch elements to fully efficient engagement.

20. In a clutch control, the combination with a friction clutch having driving and driven elements engageable for transmitting torque from a drivingly connected internal-combustion engine controlled by a movable accelerator; means for engaging said clutch elements; and means for operatively disengaging and controlling the re-engaging of said elements including said ac-accelerator; of means comprising an electrical control circuit for actuating said disengaging means and including a source of electrical energy, a switch responsive to predetermined movements of said accelerator, and an additional switch responsive directly to the torque transmitted by said clutch elements during initial engaging thereof, said switches in combination actuating said disengaging means for controlling said clutch elements from a fully disengaged condition thereof to their fully engaged condition in accordance with the torque-transmitting capacity of said clutch elements and the movement of said accelerator.

21. In a clutch control, the combination with a friction clutch having co-rotatable driving and driven elements engageable for transmitting torque from a drivingly connected internal combustion engine controlled by a movable accelerator, spring-operated means for engaging said clutch elements, a source of pressure different from that of the atmosphere, power-operated means responsive to said source of pressure for disengaging and controlling the re-engaging of said clutch elements, of valve means actuatable to control communication of said power means with said source and with atmospheric pressure, and means including a first member rotatable with the driven element of said clutch and a second member initially relatively angularly displaceable with respect to said first member in direct response to the torque transmitted by said clutch elements during their initial engagement and subsequently co-rotatable with said first member in response to predetermined movements of said accelerator for actuating said valve means to modulate the control of said clutch elements from a fully disengaged condition thereof to their fully engaged condition under the influence of said power-operated means.

22. In a vehicular drive system including a torque-producing internal combustion engine having an accelerator mechanism actuatable from a predetermined position through a range of movement to control operation of the engine, a transmission receiving torque-load from the engine, movable torque-transmitting clutch elements interposed between said engine and said transmission for engagement with one another to transfer said torque-load therebetween, and power means operable through a range of movement to control said clutch elements into initial slipping engagement and to final full engagement; the improvements which comprise an electrical control circuit including a source of electrical energy, switch means in said circuit adapted upon movement of said accelerator mechanism from said predetermined position to control said power means, and a second switch in said circuit actuated by the torque load transmitted through said clutch elements with an initial slipping contact to arrest operation of said power means after a predetermined extent of clutch element engagement to transmit a degree of torque by slipping contact, and means operatively connected to said accelerator mechanism for actuation thereby throughout the range of movement of said mechanism to determine the rate of reengagement of said clutch elements under the control of said power means from said initial slipping engagement to said final full engagement.

23. In a vehicular drive system including a torque-producing internal combustion engine having an accelerator mechanism actuatable from a predetermined position through a range of movement to control operation of the engine, a transmission receiving torque-load from the engine, movable torque-transmitting clutch elements interposed between said engine and said transmission for engagement with one another to transfer said torque-load therebetween, and power means operable through a range of movement to control said clutch elements into initial slipping engagement and to final full engagement; the improvements which comprise an electrical control circuit including a source of electrical energy, a switch in said circuit adapted upon movement of said accelerator mechanism from said predetermined position to actuate said power means, and a second switch in said circuit actuated by that torque transmitted through said clutch elements when the same are in initial slipping contact to arrest operation of said power means thereafter under the control of torque load, and means operatively connected to said accelerator mechanism for actuation thereby throughout the range of movement of said mechanism to determine the rate of reengagement of said clutch elements from said initial slipping engagement into said final full engagement, said last-mentioned means being inoperable until said second switch is actuated by said torque-load despite actuation of said accelerator mechanism.

24. In a vehicular drive system including a torque-producing internal combustion engine and coupling means for transferring said torque to an associated transmission; the improvements which comprise power means for controlling said coupling means to establish torque transferral therethrough, and torque-responsive control means operative in connection with said power means for controlling the extent of actuation of said coupling means in direct accordance with the degree of torque transferred through said coupling means, said control means including an electrical circuit comprising a source of current, an electrically actuated means energized by said source for controlling operation of said power means to control said coupling means, and a torque-actuated switch for controlling energization of said last-mentioned means.

25. In a vehicular drive system including a prime mover having an actuatable throttle control and coupling means having a pair of relatively movable elements for transmitting torque from said prime mover to a driven member and actuatable to a disengaged position and to a plurality of engaged positions including an initial partially effective torque-transmitting position and a final fully effective position; the improvements which comprise means including a fluid pressure responsive motor for operatively disengaging the elements and controlling said elements during reengaging, and means for controlling the re-engagement of the elements comprising valve means having a movable element for controlling the admission of fluid to said motor and means including a member relatively angularly displaceable with respect to said driven member in direct response to torque transmitted through said elements to said driven member after initial engagement of said elements for moving the valve element to interrupt the admission of fluid to said motor for thereby controlling the extent of movement of said elements toward their final position, and means operable in response to actuation of said throttle control to move said valve element to accommodate actuation of said elements to their final position.

26. In a controlling mechanism for a clutch having torque-transmitting elements movable to a plurality of engaged positions of varying torque-transmitting efficiency, the improvements which comprise fluid actuated power means for operatively disengaging the clutch elements, and means arresting re-engagement movement of said elements comprising a fluid flow control valve for controlling actuation of said power means, means including relatively angularly displaceable parts one of which is subject to the torque-load transmitted through the clutch elements when the clutch is engaged, said displaceable parts being operatively connected to said valve to interrupt actuation of said motor after initial engagement of said clutch elements to transmit a predetermined torque to said displaceable parts, and other means also operatively connected to said valve for overruling said displaceable parts to reactuate said motor after actuation thereby has been interrupted in response to the torque-load on said displaceable parts.

27. In controlling mechanism for a torque-transmitting clutch provided with rotatable relatively movable clutch elements having engageable frictional surfaces which vary in thickness due to wear, means for moving one of said clutch elements to disengage said frictional surfaces, means for re-engaging said elements by movement of said one of said clutch elements, automatically functioning means co-rotatable with said elements and relatively angularly displaceable in direct response to the degree of torque being transmitted by said engaged frictional surfaces for controlling the extent of re-engagement of said clutch elements under the influence of said re-engaging means by halting movement of said one of said clutch elements, and operator-controlled means effective to overrule said last-named automatically functioning means to control further movement of said one of said clutch elements into final engagement, said automatically functioning means always functioning uniformly during clutch re-engagement to halt initial engagement after a predetermined point of torque transmission is attained by said frictional surfaces irrespective of the extent of wear of said surfaces during their full service life.

28. In a clutch control, the combination with a friction clutch including angularly displaceable driving and driven elements engageable for the transmission of torque, and means to engage said elements, of control means actuated directly by the torque transmitted through said elements during only initial engaging thereof for controlling the extent of engagement of said elements by said engaging means, said control means including rotatable relatively angularly movable members one of which is operatively connected to one of said clutch elements for angular displacement therewith and which is operatively connected to said engaging means to arrest engagement of said element when said one of said members is angularly displaced, and other means operable independently of said control means to control said elements into final engagement.

29. In a clutch control, the combination with a vehicular clutch having friction elements engageable for the transmission of torque, and power means for disengaging and controlling re-engaging of said elements, of control means including a pair of relatively angularly movable members actuated for relative movement directly by the torque transmitted through said elements during their initial re-engaging for controlling the extent of engagement of said elements by said power means only until an initially engaged condition is attained, and additional control means for causing operation of said power means, to control full re-engagement of said clutch elements independently of said movable members.

30. In a clutch control, the combination with a friction clutch including rotatable driving and driven elements engageable for the transmission of torque, spring-operated means for engaging said elements, and power-operated means for disengaging and controlling the re-engaging of said elements in opposition to said spring-operated means, of control means including members coaxial with said driven element and responsive directly to the torque transmitted by said elements during initial engaging thereof for relative angular movement with respect to one another, said angular movement regulating the extent of engagement of said elements as the consequence of controlling said spring engaging means by arresting operation of said power-operated means, and means operable independently of movement of said members for restoring operation of said power means to control full engagement of said elements.

31. In a clutch control, the combination with a friction clutch having driving and driven elements engageable for transmitting torque from a drivingly connected internal combustion engine controlled by a depressible accelerator pedal, means to engage said elements, and fluid pressure responsive means for disengaging and controlling the re-engaging of said elements, of control means including a fluid pressure valve and valve actuating means including members subject to the torque-load transmitted by said clutch elements and angularly movable with respect to one another in direct response to the torque imposed thereon by said elements only during initial engaging thereof, and means responsive to depression of said accelerator pedal for conditioning said valve for actuation to control the re-engaging of said clutch by said disengaging means independently of and only after relative angular movement of said members.

32. In a vehicular drive system including a torque-producing internal combustion engine having an accelerator mechanism actuatable from a predetermined position through a range of movement to control operation of the engine, a transmission receiving torque-load from the engine, movable torque-transmitting clutch elements interposed between said engine and said transmission for engagement with one another to transfer said torque-load therebetween, and power means operable through a range of movement to control said clutch elements into initial slipping engagement and to final full engagement; the improvements which comprise actuatable control means responsive to actuation of said accelerator mechanism from said predetermined position for initiating movement of said clutch elements toward engagement under control of said power means, and means including relatively angularly displaceable members responsive to the torque-load transmitted through said clutch elements when in initial slipping engagement to actuate said control means for arresting further movement of said clutch elements toward full engagement, said control means also being actuatable by said accelerator mechanism through its range of movement but only after relative displacement of said members to control the rate of re-engagement of said clutch elements from said initial slipping engagement to said final full engagement.

33. In a vehicular drive system including a prime mover having an accelerator mechanism including a depressible pedal and coupling means having a pair of relatively movable elements for transmitting torque from said prime mover to a driven member and actuatable to a disengaged position and to a plurality of engaged positions including an initial partially effective torque-transmitting position and a final fully effective position; the improvements which comprise means including a fluid pressure-responsive motor connected to a source of fluid at a pressure different from that of the atmosphere for operably disengaging the elements and controlling said elements during re-engaging, and means for controlling the re-engaging of said elements comprising valve means having a movable element interposed between said source of fluid and said motor for controlling the admission of fluid to said motor, and means including a member relatively angularly displaceable with respect to said driven member in direct response to torque transmitted through said elements to said driven member after initial engagement of said elements for moving the valve element to interrupt the admission of fluid to said motor, and a shut-off valve interposed between said source and said valve means for operation in response to initial pedal depression to connect said valve means to said source for inaugurating torque-responsive movement.

34. In a clutch control, the combination with a friction clutch having driving and driven elements for transmitting torque from a drivingly connected internal-combustion engine controlled by a movable accelerator, spring-operated means for engaging said elements; power-operated means including a source of power therefor for operatively disengaging and controlling the re-engaging of said clutch elements by opposing clutch element re-engagement under the influence of said spring-operated means, of control means including a pair of members disposed for limited relative angular movement with respect to each other to operating position and responsive directly to the driven element when subjected to torque transmission during initial engagement thereof with said driving element for controlling the extent of engagement of said clutch elements by modulation of the opposition of said power means to said spring-operated means after re-engagement of said clutch elements has been initiated by a predetermined movement of said accelerator, further movement of said accelerator being effective to cause said control means to control the rate of final engagement of said clutch elements in accordance with engine operating conditions after the relative movement of said members and the initial modulation of said power means have been rendered effective.

35. In a clutch control, the combination with a friction clutch having driving and driven elements engageable and co-rotatable for transmitting torque from a drivingly connected internal-combustion engine controlled by a movable accelerator, spring-operated means for engaging said clutch elements, energizable power - operated means including a source of energy therefor for operatively disengaging and controlling the re-engaging of said clutch elements in opposition to the force of said spring-operated means, a control element actuatable in response to a predetermined movement of said accelerator to interrupt energization of said power-operated means by said source and to accommodate initial re-engagement of said clutch elements by said spring-operated means, of means including a pair of co-rotatable relatively displaceable members angularly movable relatively with respect to each other in response to the torque transmitted by said driven element when initially engaged with said driving element to modulate operation of said power-operated means in accordance with said initial torque transmission by said clutch elements and further movement of said accelerator.

36. In a vehicular drive system including a torque producing internal-combustion engine having a movable accelerator control, a transmission receiving torque-load from said engine, movable torque-transmitting clutch elements interposed between said engine and said transmission and engageable with one another by spring-operated means for co-rotation to transfer said torque-load to said transmission, and power means including a source of power operable to control said clutch elements in opposition to the force of said spring-operated means into engagement through a range of relative movement including an initial movement to a partially effective torque-transmitting relation and a final movement to a fully effective co-rotational torque-transmitting relation; the improvements which comprise control means for said power means including a pair of members operatively interposed between the said driven element and transmission, and angularly movable relatively with respect to each other when subjected to the partially effective torque-load transmitted through said clutch elements upon initial movement of said elements in response to a predetermined engine accelerating movement of said accelerator to render said power means ineffective to retain said clutch elements in fully disengaged relation against the biasing force of said spring-operated means, said members being co-rotatable in their relatively angularly moved relation to modulate further operation of said power means, thus insuring smooth final movement of said clutch elements into fully engaged co-rotational relation by said spring-operated means controlled by said power means in response to further movements of said accelerator.

37. In control means for friction clutches having a driving member and a driven member actuatable into partially and fully engaged conditions to transmit torque at different efficiencies, and into disengaged condition to interrupt transmission of torque; an actuator including pre-energized spring means for actuating said clutch members into fully disengaged condition in opposition to the force of said spring means, and for controlling said clutch members in cooperation with said spring means into engaged condition: a driven shaft; a torque transmitting spring-loaded connection operatively incorporated between said driven member and the driven shaft to accommodate limited relative movement therebetween in opposition to said spring-load; means defining said limited relative movement; means including a personally-operable member operatable sequentially through first and second movements; torque-responsive means including an element actuatable to operating position in response to the aforesaid relative movement effective upon partial engagement of said clutch members; control means operable in response to first movement of said personally-operable means to cause the actuator to accommodate movement of said clutch members into partially engaged condition by said spring means; and means controlled by the torque-responsive means actuated to operating position in the manner aforestated, to cause the actuator to controllably arrest movement of said clutch members by said spring means in their aforementioned partially engaged condition.

38. A friction clutch control according to claim 37 wherein the control means incorporates structure operable in response to second movement of said personally-operable means to accommodate control of said clutch members into fully engaged condition by the actuator controlled spring means notwithstanding the torque-responsive means is actuated into operating position.

39. A friction clutch control according to claim 38 including an internal-combustion engine controlled by a fuel supplying throttle device responsive to the sequential movements of the aforesaid personally-operable means.

40. A friction clutch control according to claim 39 wherein the personally-operable means is the engine controlling accelerator treadle mechanism, and first movement thereof being from engine idling position in an engine accelerating direction.

41. A friction clutch control according to claim 40 wherein the control means incorporates structure operable upon operating the accelerator treadle into engine idling position, to cause the actuator to effect full disengagement of said clutch members, whereupon the additionally spring-loaded connection is released to automatically restore the relative movement between the driven member and the drive shaft in normally spring-loaded condition.

42. A friction clutch control according to claim 37 wherein said last-named means incorporates structure operable to cause the actuator to controllably retard the rate of engagement of said clutch member by said spring means from partially engaged condition into fully engaged condition.

43. In control means for friction clutches having a driving member and a driven member movably engageable for co-rotation in full drive torque transmitting relation, and separable to interrupt transmission of driving torque from an associated prime mover having an actuatable throttle control for varying torque production of said prime mover; means biasing said clutch members into engagement; energizable power means operable in opposition to said biasing means for separating said clutch members, and controllable in cooperation with said biasing means to engage said clutch members; means for energizing said power means; control means responsive to initial actuation of said throttle control to disable said power means, thereby accommodating controlled movement of said clutch members into initial engagement under the influence of said biasing means; means controlled by the said driven member when subjected to torque transmission, upon initial engagement thereof with said driving member, to render said power means effective only sufficiently to controllably oppose said biasing means to arrest said clutch members in said initially engaged relation; and means responsive to further actuation of said throttle control to render the aforementioned driven member torque control of said power means ineffective, thereby accommodating full engagement of said clutch members in co-rotational relation by said biasing means.

44. A friction clutch control according to claim 43 wherein the said control means incorporates structure operable in response to actuating said throttle control to a position defining substantially the beginning of the aforesaid initial actuation thereof to cause energization of the said power means to separate the said clutch members against the force of the biasing means.

45. A friction clutch control according to claim 43 wherein the means controlled by said driven member incorporates structure operable in the manner described to render said power means effective only sufficiently to controllably oppose the force of said biasing means to retard the rate of movement of said clutch members through their initially engaging range of relation.

GLENN T. RANDOL.

REFERENCES CITED

The following references are of record in the file of this patent:

UNITED STATES PATENTS

| Number | Name | Date |
| --- | --- | --- |
| 1,934,671 | Hill | Nov. 7, 1933 |
| 2,083,530 | Hill | June 8, 1937 |
| 2,084,387 | Dickieson | June 22, 1937 |
| 2,086,954 | Fawick | July 13, 1937 |
| 2,109,420 | Guernsey | Feb. 22, 1938 |
| 2,225,315 | McCollum | Dec. 17, 1940 |